(12) United States Patent
Lanoiselee

(10) Patent No.: US 10,432,440 B2
(45) Date of Patent: Oct. 1, 2019

(54) METHOD AND DEVICE FOR GENERATING A MULTICARRIER OFDM SIGNAL, METHOD AND DEVICE FOR ATTENUATING EXTREMA OF SUCH A SIGNAL, CORRESPONDING COMPUTER PROGRAM PRODUCTS

(71) Applicant: B-COM, Cesson Sevigne (FR)

(72) Inventor: Marc Lanoiselee, La Chapelle des Fougeretz (FR)

(73) Assignee: B-COM, Cesson Sevigne (FR)

( * ) Notice: Subject to any disclaimer, the term of this patent is extended or adjusted under 35 U.S.C. 154(b) by 0 days.

(21) Appl. No.: 16/085,828

(22) PCT Filed: Mar. 16, 2017

(86) PCT No.: PCT/EP2017/056326
§ 371 (c)(1),
(2) Date: Sep. 17, 2018

(87) PCT Pub. No.: WO2017/158133
PCT Pub. Date: Sep. 21, 2017

(65) Prior Publication Data
US 2019/0173702 A1 Jun. 6, 2019

(30) Foreign Application Priority Data

Mar. 17, 2016 (FR) ...................... 16 52292

(51) Int. Cl.
*H04K 1/10* (2006.01)
*H04L 27/26* (2006.01)

(52) U.S. Cl.
CPC ...... *H04L 27/2605* (2013.01); *H04L 27/2617* (2013.01); *H04L 27/2628* (2013.01); *H04L 27/2636* (2013.01)

(58) Field of Classification Search
CPC ............. H04L 27/2605; H04L 27/2617; H04L 27/2628; H04L 27/2636
(Continued)

(56) References Cited

U.S. PATENT DOCUMENTS

| 9,614,712 B2 | 4/2017 | Lanoiselee |
| 2006/0140296 A1* | 6/2006 | Cleveland ........... H04L 27/2618 375/260 |

FOREIGN PATENT DOCUMENTS

FR 3003107 A1 9/2014

OTHER PUBLICATIONS

English Translation of the Written Opinion of the International Searching Authority dated May 23, 2017 for corresponding International Application No. PCT/EP2017/056326, filed Mar. 16, 2017.
(Continued)

*Primary Examiner* — Zewdu A Kassa
(74) *Attorney, Agent, or Firm* — David D. Brush; Westman, Champlin & Koehler, P.A.

(57) ABSTRACT

A method is proposed for generating an OFDM type multicarrier signal including OFDM blocks constituted by M carriers modulated by source symbols. The method includes the following steps: interleaving the M symbols of a block of source symbols into R sub-blocks of N interleaved symbols; obtaining a block of M time domain samples corresponding to the block of M source symbols; forming a peak vector containing N maximum amplitudes determined from among the M samples; attenuating the extrema of each sub-block of N time domain samples corresponding to the R sub-blocks of N interleaved symbols by a correction of symbols taking account of the peak vector and delivering R sub-blocks of N corrected interleaved symbols; de-interleaving the R sub-blocks of N corrected interleaved symbols delivering a block of M corrected source symbols; generat-
(Continued)

ing an OFDM block of the signals corresponding to the block of M corrected source symbols.

14 Claims, 7 Drawing Sheets

(58) Field of Classification Search
USPC .................................. 375/260, 259, 316, 295
See application file for complete search history.

(56) References Cited

OTHER PUBLICATIONS

"Digital Video Broadcasting (DVB); Frame structure channel coding and modulation for a second generation digital terrestrial television broadcasting system (DVB-T2)." ETSI EN 302 755 V1.3.1. Apr. 2012.
M. Mroue et al. "Performance and Implementation Evaluation of TR PAPR Reduction Methods for DVB-T2." Hindawi Publishing Corporation, International Journal of Digital Multimedia Broadcasting 2010. Aug. 26, 2010.
Aggarwal et al. "Computing the Optimal Amount of Constellation Distortion in OFDM Systems." ICC 2007 Proceedings. 2007.
Krongold et al., "PAR Reduction in OFDM via active Constellation Extension." IEEE Transactions on Broadcasting, vol. 49, No. 3. Sep. 2003.
Han et al., "Tone Injection with Hexagonal Constellation for Peak-to-Average Power Ratio Reduction in OFDM." IEEE Communications Letters, vol. 10, No. 9, Sep. 2006.
International Search Report dated May 16, 2017 for corresponding International Application No. PCT/EP2017/056326, filed Mar. 16, 2017.
Written Opinion of the International Searching Authority dated May 16, 2017 for corresponding International Application No. PCT/EP2017/056326, filed Mar. 16, 2017.
Seog Geun Kang et al., "A novel Subblock Partition Scheme for Partial Transmit Sequence OFDM" IEEE Transactions on Broadcasting, IEEE Service Center, Piscateway, NJ, US, vol. 45, No. 3, Sep. 1, 1999 (Sep. 1, 1999), pp. 333-338, XP011083079.
Lu G et al., "Enhanced Interleaved Partitioning PTS for Peak-to-Average Power Ratio Reduction in OFDM Systems", Electronics Letters, IEEE Stevenage, GB, vol. 42, No. 17, Aug. 17, 2006 (Aug. 17, 2006), pp. 983-984, XP006027164.
D.-W. Lim et al., "A New PTS OFDM Scheme with Low Complexity for PAPR Reduction", IEEE Transactions on Broadcasting, vol. 52, No. 1, Mar. 1, 2006 (Mar. 1, 2006), pp. 77-82, XP055318196.
French Search Report and Written Opinion dated Nov. 14, 2016 for corresponding French Application No. 1652292, filed Mar. 17, 2016.

\* cited by examiner

METHOD AND DEVICE FOR GENERATING A MULTICARRIER OFDM SIGNAL, METHOD AND DEVICE FOR ATTENUATING EXTREMA OF SUCH A SIGNAL, CORRESPONDING COMPUTER PROGRAM PRODUCTS

CROSS-REFERENCE TO RELATED APPLICATIONS

This Application is a Section 371 National Stage Application of International Application No. PCT/EP2017/056326, filed Mar. 16, 2017, which is incorporated by reference in its entirety and published as WO 2017/158133 A1 on Sep. 21, 2017, not in English.

FIELD OF THE INVENTION

The field of the invention is that of radiofrequency communications for which a multicarrier modulation, especially of the OFDM (Orthogonal Frequency Division Multiplex) type is used.

More specifically, the invention relates to a method for generating such a signal as well as a method for attenuating extrema of such a signal by correction of constellation symbols.

Owing to the widespread use of OFDM type multicarrier modulation, the invention has numerous applications, especially but not exclusively in the fields of wireless local networks (Wi-Fi), 3GPP LTE (3rd Generation Partnership Project and Long-Term Evolution) cellular mobile radiotelephony or again ADSL (Asymmetric Digital Subscriber Line) telephony but also in the field of data broadcasting as described for example in standards for Digital Audio Broadcasting (DAB), Digital Television Broadcasting, especially DVB-T (Digital Voice Broadcasting-Terrestrial) or again the new DVB-T2 standard.

TECHNOLOGICAL BACKGROUND

One major drawback of the OFDM technique is inherent in the high fluctuations in the amplitude of the modulating signal obtained.

In the time domain, the summing of the independently modulated carriers is done coherently. Owing to the large number of these carriers that are summed together, amplitude extrema can be encountered in the modulating signal when the summing of the modulated carriers by the data symbols becomes constructive.

These extrema in the modulated symbol give rise to corresponding extrema in the modulated radiofrequency. In this case, it is not rare for the instantaneous power of the modulated signals to surpass the average power of the signal by more than 10 dB at certain points in time.

These large variations of amplitude and power cause problems in several respects:

first of all, they raise problems on the baseband modulating signal because they require over-sizing of the data path to enable the signal to propagate without clipping;

but above all they have consequences for the modulated radiofrequency signal because they need to have power stages sized to deliver instantaneous maximum peak power whereas it is only the average power of the signal that is of utility to ensure a link budget. The overconsumption associated with this special sizing of the transmission stages is a particular source of problems in systems using this type of multicarrier modulation.

Different metrics are conventionally used to quantify these fluctuations. For example, the crest factor (CF) is often used for baseband modulating signals. Here, it is the ratio of the maximum amplitude of the signal to its root-mean-square (RMS) value. This ratio can itself be expressed in terms of natural value or decibels. For modulated radiofrequency signals, the PAPR (Peak to Average Power Ratio) is often used. This is then the ratio between the instantaneous power of the signal and its mean power, for a modulated signal x(t):

$$PAPR = \frac{\max_t |x(t)|^2}{E \cdot [|x(t)|^2]}$$

Here again, this ratio can be expressed in terms of natural value or decibels. Since this latter metric is based on the notion of the power of the modulated radiofrequency signal, it is often used in the radiofrequency domain because it is directly related to the problem of consumption of the power stages mentioned here above. In every case, there is a direct link between the extrema of the baseband modulating signal and the extrema of the modulated radiofrequency signal.

Faced with this problem of high-value extrema in this type of multicarrier modulation, different methods have been proposed to try and minimize them.

A first group of methods is based on what is known as "clipping" in which the amplitude of the signal is clipped when it goes beyond the pre-defined threshold. However, this clipping is by nature non-linear and introduces a distortion of the signal sent out that results not only in a degraded bit error rate but also a increase in the side lobes of the power spectral density of the signal after clipping.

A second group of methods is based on the application of a constraint or encoding on the data sequence emitted in order to limit the fluctuation of the modulating signal. In this method, a set of code words is built. This set of code words minimizes the extrema of this signal. Several techniques for building these codes have been proposed. The advantage of this approach is that it does not introduce any distortion. However, the spectral efficiency is penalized without even bringing any gain in encoding. In addition, to date, its field of application is limited to OFDM modulations with a small number of carriers because of its excessively high computational complexity.

In the face of these problems, a third group of methods has been proposed, based on the correction of constellation symbols modulating the carriers. The underlying idea in all these methods of this third group is that they play on the value of the modulation symbols to eliminate constructive summations during the coherent summing of all the carriers thus modulated. Several known methods are based on this principle, for example:

the "TI-CES" (Tone Injection Constellation Extension Scheme) methods as described for example in the article by S. H. Han, J. M. Cioffi, *"Tone Injection with Hexagonal Constellation for Peak-to-Average Power Ratio Reduction in OFDM"*, IEEE Communications Letters, Vol 10, no 9, September 2006, which proposes to increase the number of points of the constellation that modulate the OFDM carriers so that a point of the original constellation can have numerous corresponding possibilities of co-ordinates in the new constellation. According this approach, this additional degree of freedom is used to generate a signal of lower PAPR. However, the selection of the best possible co-ordinates for each point requires an increase in the computational complexity implemented, making it unsuited to hardware implementation for the real-time processing of signals.

the ACE (Active Constellation Extension) method, described for example in the article by B. S. Krongold, D. L. Jones, *"PAR Reduction in OFDM via active Constellation Extension", IEEE Trans. On Broadcasting*, Vol. 49, no 3, September 2003, is also based on a constellation modification and relies on a shift towards greater distance from the decision axes. However, in the same way as for the preceding method, this technique is characterized by a very high computational complexity.

the "CD" (Constellation Distortion) method as described for example in the article by A. Aggarwal, E. R. Stauffer, T. H. Meng, *"Computing the Optimal Amount of Constellation Distortion in OFDM Systems", ICC 2007 Proceedings*, is also based on a modification of constellations and relies on the hypothesis that the output level of the amplification of transmission is limited by instantaneous power peaks and that, if the amplitude of the peaks can be reduced, then the power emitted can be increased. According to this technique, for a given rate of distortion, a problem of optimization, known as a convex optimization problem, is resolved in order to elaborate an OFDM signal with a minimum global PAPR level. However, the computational complexity implemented increases exponentially when the constellation order becomes high.

the "TR" (Tone Reservation) method as described for example in the article by M. Mroué, A. Nafkha, J. Palicot, B. Gavalda, N. Dagorne *"Performance and implementation Evaluation of TR PAPR Reduction Methods for DVB-T2", International Journal of Digital Multimedia Broadcasting* 2010, which proposes to reserve certain carriers of the OFDM multiplex that do not carry information but symbols optimized at emission to reduce the PAPR. These symbols can be optimized by using for example a convex optimization algorithm of the SOCP (Second Order Cone Programming) type. However, the computational power needed to implement this method remains great.

PCTS (Pre-Constructed Temporal Signal) described in the French patent application FR 3 003 107 which proposes to compute the symbol corrections on the basis of a complex correlation between, on the one hand, the cosine and sine samples of the carrier at a given order and, on the other hand, the real and imaginary samples of the peak values detected in the sum of the corrected carriers of an order lower or equal to the given order. Besides, the shifting of symbols authorized for the correction can be constrained and can correspond for example to the shifts permitted in the ACE method. However, here too, the computational complexity remains high when the number of carriers increases.

It appears then that these methods for reducing extrema based on the correction of the constellation symbols modulating the carriers remain too complex in term of computation load when the number of carriers becomes great as is the case in modern broadcasting standards.

There is thus a need for a method for reducing extrema of an OFDM type multicarrier signal by correction of the constellation symbols that have limited complexity of implementation.

SUMMARY OF THE INVENTION

One embodiment of the invention proposes a method for generating an OFDM type multicarrier signal comprising OFDM blocks constituted by M carriers modulated by constellation symbols, known as source symbols, a block of M source symbols corresponding to an OFDM block of M carriers. Such a method comprises, on the one hand:

a step for interleaving the M symbols of a block of source symbols into R sub-blocks of N interleaved symbols, where R, M and N are natural integers such that $M = R \times N$;

and on the other hand, steps for:

obtaining a block of M time domain samples by discrete Fourier transform of the block of M source symbols;

a determining N maximum amplitudes from among the samples of the block of M time domain samples and forming a vector containing the N maximum amplitudes, called a peak vector.

Such a method also comprises steps for:

attenuation, by correction of constellation symbols, of the extrema of a sub-block of N time domain samples corresponding to the discrete Fourier transform of one of the R sub-blocks of N interleaved symbols, the correction taking account of at least the peak vector and delivering a sub-block of N corrected interleaved symbols, the step for attenuating repeated for each sub-block among said R sub-blocks of N interleaved symbols, delivering R sub-blocks of N corrected interleaved symbols;

de-interleaving the R sub-blocks of N corrected interleaved symbols delivering a sub-block of M corrected source symbols; and generating an OFDM block of the multicarrier signal by discrete Fourier transform of the block of M corrected source symbols.

Thus, the invention proposes a novel and inventive solution to enabling the generation of an OFDM block constituted by a set of M carriers modulated by source constellation symbols, this block having peak amplitude values that are attenuated relative to the same block generated conventionally through the direct application of a Fourier transform to the block of M corresponding source constellation symbols.

To this end, the claimed method proposes to apply a method of attenuation of such extrema by shifting the constellation symbols not to the entire block of M source symbols as is done conventionally but to one set of R sub-blocks of N interleaved symbols obtained from the block of source symbols. Since the number N of symbols of each of these R sub-blocks is smaller than the number M of symbols of the block of source symbols, the claimed method leads to a reduction of the complexity of implementation of the known methods of attenuation of the extrema used, thus enabling realistic hardware implementations when the number of carriers increases. At the same time, it minimizes the energy consumption of the system.

According to one embodiment, during the step of interleaving the M symbols of a block of source symbols into R sub-blocks of N interleaved symbols, an i-th sub-block of N interleaved symbols, i being an integer ranging from 1 to R, comprises symbols indexed (i−1)+k*R of the block of source symbols, k being an integer ranging from 0 to N−1.

This interleaving gives a simple and direct relationship between the indices of the samples obtained by the application of a discrete Fourier transform on the block of M source symbols and the indices of the corresponding samples obtained by discrete Fourier transform of the sub-blocks of N interleaved symbols thus determined.

According to one characteristic, an element indexed j of the peak vector, where j is an integer ranging from 0 to N−1, is equal to the maximum amplitude of the samples indexed j+r*N of the block of M time domain samples with r being an integer ranging from 0 to R−1.

Thus, the claimed method can be used to determine a peak vector serving as a constraint vector for implementing the method for attenuating extrema applied to each of the R sub-blocks of the interleaved symbols. This peak vector is determined solely on the basis of the extrema present in the OFDM block corresponding to the block of M source symbols and is, moreover, common to all the sub-blocks of N interleaved symbols corresponding to this block of source symbols leading thereby to a simple and efficient implementation of the method claimed.

In one embodiment of the invention, the step for attenuating extrema by correction of constellation symbols is done successively for each of the R sub-blocks of N interleaved symbols. Besides:

the step for attenuating carried out for the sub-blocks 1 to v−1 of N interleaved symbols, where v is an integer ranging from 2 to R, delivers v−1 sub-blocks of N corrected interleaved symbols;

when the step for attenuating is carried out for a v-th sub-block of N interleaved symbols, the peak vector taken into account by the correction is updated as a function of an amplitude of at least one time domain sample among v−1 sub-blocks of N corrected interleaved time domain samples corresponding to the discrete Fourier transform of the v−1 sub-blocks of N preliminarily obtained corrected interleaved symbols.

Thus, in this embodiment, the peak vector can be updated after each application of the method of attenuation of the extrema to one of the sub-blocks of interleaved symbols with a view to applying this method of attenuation to the following sub-block of interleaved symbols. Indeed, the correction of the interleaved symbols obtained by the successive application of the method of attenuation of extrema to each sub-block of interleaved symbols can lead not only to the minimizing of the extrema present in the original peak vector, but also to the generation of new extrema not present in the original peak vector and therefore not taken into account by default during the application of the method for attenuating extrema to each sub-block of interleaved symbols. The updating of the peak vector after each application of the method of attenuation of extrema with a view to applying the method of attenuation to the next sub-block of interleaved symbols then makes it possible to take account of this potential generation of these new extrema and their correction, if necessary, through the application of the method of attenuation of the extrema to the sub-blocks of interleaved symbols still to be processed on the basis of the updated peak vector.

More particularly, when the step for attenuating is performed for the v-th sub-block of N interleaved symbols, the updating of the peak vector taken into account by the correction corresponds, for an element indexed s of said peak vector, s being an integer ranging from 0 to N−1, to:

an incrementing of the element indexed s by a value corresponding to a difference, weighted by first corrective factor Gup, between an amplitude of a sample indexed s of a sub-block of N corrected interleaved time domain samples corresponding to the discrete Fourier transform of the sub-block ranked v−1 of N pre-obtained, corrected interleaved symbols and an amplitude of a sample indexed s of a sub-block of N interleaved time domain samples corresponding to the discrete Fourier transform of the sub-block ranked v−1 of N interleaved symbols when the difference is positive or null;

decrementing of the elements indexed s by a value corresponding to this difference weighted by a second corrective factor Gdown when the difference is negative.

Thus, the updating of the peak vector, after the application of the method for attenuating extrema to a sub-block of interleaved symbols, can be done by weighting the increase or by reducing the amplitude of the time domain samples corresponding to the modulation of the carriers by the corrected interleaved symbols obtained relative to their original value corresponding to the modulation of the carriers by the source symbols. This weighting thus makes it possible to take account of the generation of an extremum, or the reduction of the amplitude of the signal, related to the flexible and adaptive application of the method for attenuating extrema to one of the sub-blocks of interleaved symbols, thereby improving the performance of the system.

In one embodiment, the first corrective factor Gup is equal to 1 and the second corrective factor Gdown is equal to 0.707.

Thus, when the application of the method for attenuating extrema to one of the sub-blocks of interleaved symbols leads to an increase in the amplitude of one of the corresponding time domain samples, this increase is taken into account in the peak vector with a weighting that is preferably 1 in such a way as to consider a worst case of contribution of this sample to an extremum of the final signal (this increase could potentially be summed constructively with same-order samples coming from the modulation of the carriers by the corrected interleaved symbols of the other sub-blocks of interleaved symbols). In the same way, when the application of the method of attenuating extrema to a sub-block of interleaved symbols leads to a reduction of the amplitude of one of the corresponding time domain samples, this reduction is taken into account in the peak vector with a weighting preferably of 0.707 corresponding to a toot-mean-square summing with the other same-order samples so as not to overestimate the impact of the reduction obtained on the final signal.

In another embodiment of the invention, at the end of the step for obtaining a block of M time domain samples by discrete Fourier transform of the block of M source symbols, the method for generating implements a step of over-sampling of the block of M time domain samples obtained.

Thus, the processing operations in the time domain, i.e. after the application of said discrete Fourier transform, are performed on a digital signal that is over-sampled, preferably by a factor of two relative to the natural sampling frequency of said discrete Fourier transform. The extrema of the OFDM type multicarrier signals are then accurately represented in the time domain, thereby enabling their accurate processing by means of the technique described.

In different embodiments, the attenuation of the extrema by correction of the constellation symbols implements a correction belonging to the group comprising:

an ACE (Active Constellation Extension) correction;
a TI-CES (Tone Injection-Constellation Extension Scheme) correction;
a CD (Constellation Distortion) correction;
a TR (Tone Reservation) correction; and
a PCTS (Pre-Constructed Temporal Signal) correction;

Thus, the method claimed can apply equally well to any type of method for reducing extrema of an OFDM type multicarrier signal by shifting of the constellation symbols in order to reduce their complexity of implementation, especially when the number of carriers increases.

In another embodiment, the method for generating furthermore comprises a preliminary step of pre-correction of the block of M source symbols, a source symbol being pre-corrected by a pre-defined intermediate correction value between a null correction value and an extreme correction value.

Thus, in this variant, the described technique is applied not directly to a block of source symbols but to a block of pre-corrected source symbols or pre-accentuated source symbols, this pre-correction or pre-accentuation corresponding to a correction possible by the method for reducing extrema by correction of symbols implemented during the step for reducing the extrema of the sub-blocks of N interleaved symbols. Indeed, since this pre-correction or pre-accentuation can be performed statically, i.e. without taking account of the effective extrema of the corresponding time signal so as to maintain reasonable complexity, it enables the claimed method to be initiated at an intermediate state between the original source symbols and an extreme correction position and thus makes it possible to improve the performance of the method claimed as well as its speed of convergence.

Another embodiment of the invention proposes a method for attenuating extrema of an OFDM type multicarrier signal comprising a step for attenuating, by correction of constellation symbols, the extrema of a block of M time domain samples corresponding to a discrete Fourier transform of a block of N constellation symbols, the correction taking account of a peak vector representing extrema of the multicarrier signal and delivering a block of N corrected symbols. Such an OFDM type multicarrier signal comprises OFDM blocks constituted by M carriers modulated by constellation symbols, called source symbols, a block of M source symbols corresponding to an OFDM block of M carriers. In addition:

the block of N constellation symbols is a sub-block among R sub-blocks of N interleaved symbols obtained by interleaving of M symbols of a block of source symbols, where R, M and N are natural integers such that M=R×N;

the peak vector is obtained by determining N maximum amplitudes among time domain samples obtained by discrete Fourier transform of the block of M source symbols.

Such a method of attenuation furthermore comprises a step of de-interleaving of R sub-blocks of N corrected interleaved symbols obtained by repetition of the step for attenuating for each block of N constellation symbols among the R sub-blocks of N interleaved symbols.

Thus, the invention also relates to a method for attenuating extrema of an OFDM block constituted by a set of M carriers modulated by source constellation symbols via the application of a method of attenuation of such extrema by shifting of the constellation symbols not to the entire block of M source symbols but to a set of R sub-blocks of N interleaved symbols obtained from the block of source symbols. Since the number N of symbols of each of these R sub-blocks is smaller than the number M of symbols of the block of source symbols, the method claimed thus leads to a reduction of complexity of implementation of known methods for attenuating the extrema used.

The invention also concerns a computer program comprising program code instructions for the implementing of a method for generating an OFDM type multicarrier signal as described here above, according to any one of its different embodiments, when said program is executed by a processor.

Again, it concerns a computer program comprising program code instructions for the implementing of a method for reducing extrema an OFDM block as described here above, according to any one of its different embodiments, when it is executed by a In another embodiment of the invention, a device is proposed for generating an OFDM type multicarrier signal comprising OFDM blocks constituted by M carriers modulated by constellation symbols, called source symbols, a block of M source symbols corresponding to an OFDM block of M carriers. Such a generating device comprises, on the one hand:

an interleaver of M symbols of a block of source symbols into R sub-blocks of N interleaved symbols where, R, M and N are natural integers such that M=R×N.

And, on the other hand:

a first generator of a block of M temporary samples by discrete Fourier transform of the block of M source symbols;

a computer of N maximum amplitudes among the samples of the block of time domain samples and a second generator of a vector containing the N maximum amplitudes called a peak vector.

Such a generating device also comprises:

an attenuator, by correction of constellation symbols, of extrema of a sub-block of N time domain samples corresponding to the discrete Fourier transform of a sub-block of N interleaved symbols, the correction taking account of at least the peak vector and delivering a block of N corrected interleaved symbols;

a de-interleaver of R sub-blocks of N corrected interleaved symbols delivering a block of M corrected source symbols; and a third generator of an OFDM block of the multicarrier signal by discrete Fourier transform of the block of M corrected source symbols.

Such a generating device is especially capable of implementing the method for generating an OFDM type multicarrier signal (according to the invention, according to any one of the different embodiments mentioned here above).

In another embodiment of the invention, a device is proposed for the attenuation of extrema of an OFDM type multicarrier signal comprising an attenuator, by correction of constellation symbols, of the extrema of a block of N time domain samples corresponding to a discrete Fourier transform of a block of N constellation symbols, the correction taking account of a peak vector representing extrema of said multicarrier signal and delivering a block of N corrected symbols.

With the OFDM type multicarrier signal comprising OFDM blocks constituted by M carriers modulated by constellation symbols, called source symbols, a block of M source symbols corresponding to an OFDM block of M carriers, such a device for attenuating extrema comprises:

an interleaver of M symbols of a block of source symbols into R sub-blocks of N interleaved symbols, where R, M and N are natural integers such that M=R×N, the block of N constellation symbols being a sub-block among the R sub-blocks of N interleaved symbols;

a computer of N maximum amplitudes among time domain samples obtained by discrete Fourier transform of the block of M source symbols and a generator of a vector containing the N maximum amplitudes, called a peak vector.

Such a device for attenuating extrema also comprises:

a de-interleaver of R sub-blocks of N corrected interleaved symbols delivering a block of M corrected source symbols.

Thus, according to another aspect, the invention also relates to a device for attenuating extrema, that is especially capable of implementing the method for reducing extrema of an OFDM block according to the invention (according to any one of the different embodiments mentioned here above).

LIST OF FIGURES

Other features and advantages of the invention shall appear from the reading of the following description, given by way of an indicative and non-exhaustive example, and from the appended drawings, of which:

Figure 7A:
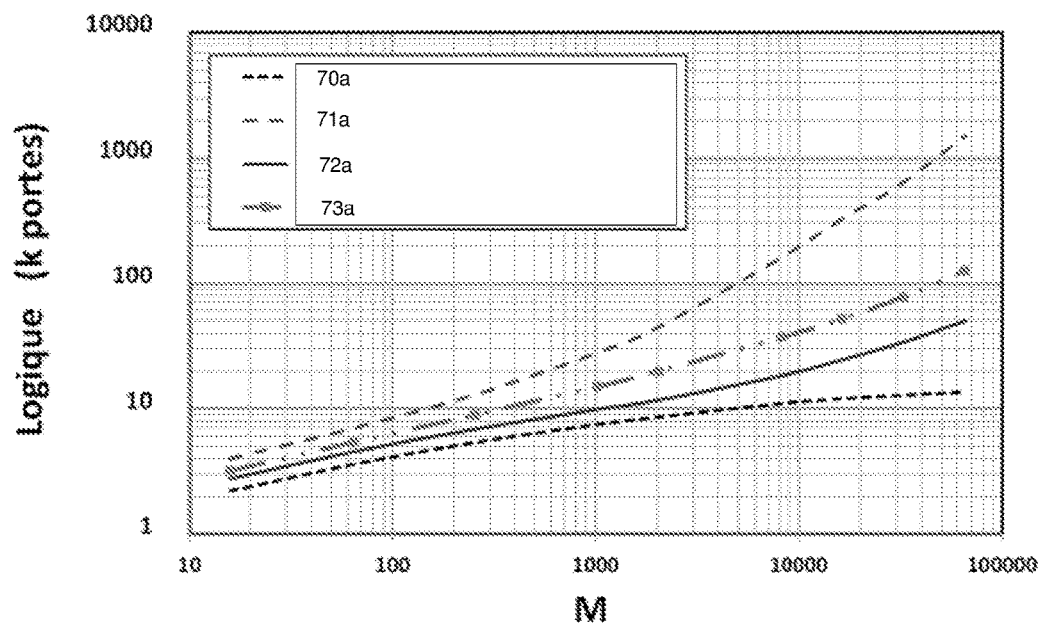
Figure 7B:
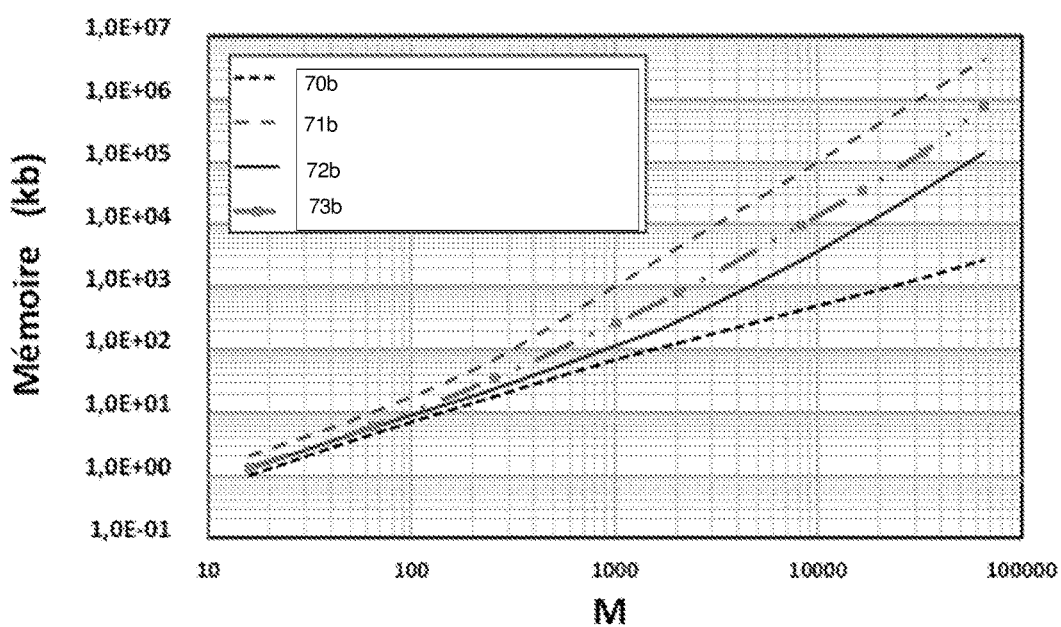
Figure 8A:
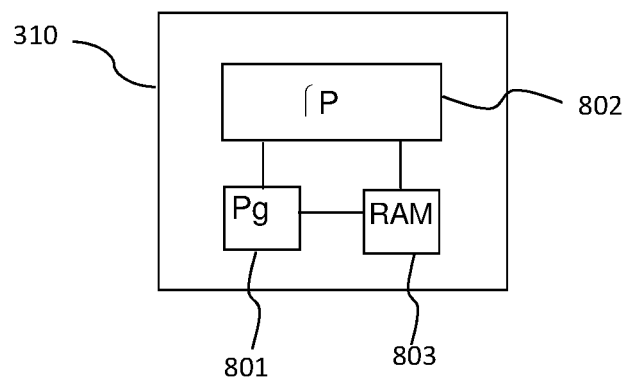
Figure 8B:
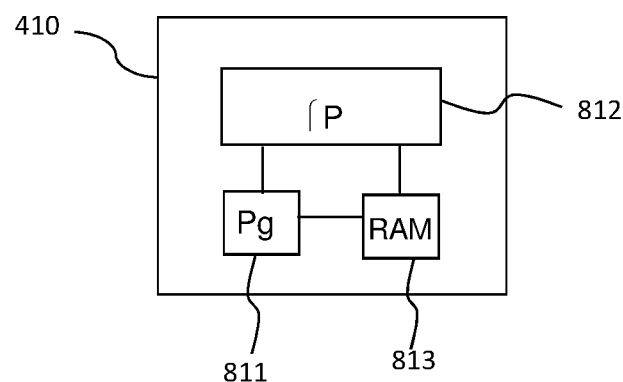
Figure 8C:
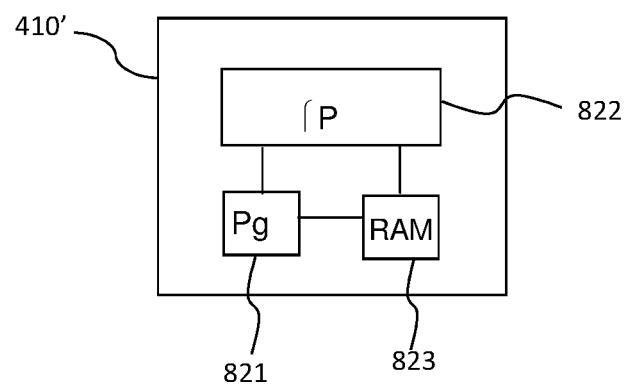

FIGS. 7a and 7b illustrate the gains obtained in terms of the number of logic gates and the memory size needed to implement a PCTS type method for reducing extrema in using the technique described; and FIGS. 8a, 8b and 8c present examples of structures of a device for generating an OFDM type multicarrier signal as well as for attenuating the extrema of an OFDM type multicarrier signal according to one particular embodiment of the invention.

DETAILED DESCRIPTION OF THE INVENTION

In all the figures of the present document, the identical elements and steps are designated by a same reference.

The general principle of the technique described consists in obtaining R sub-blocks of N symbols by interleaving a block of M source symbols that are meant to modulate the M carriers of an OFDM block, M being equal to R×N. A peak vector is also obtained on the basis of N maximum amplitudes among M time signals corresponding to the discrete Fourier transform of the block of M source symbols. As a result, a method for attenuating extrema can be implemented with reasonable complexity for each of the R sub-blocks of N interleaved symbols in taking account of the peak vector. The de-interleaving of R sub-blocks of N corrected interleaved symbols thus obtained then gives a block of M corrected source symbols corresponding to an OFDM block having extrema that are limited as compared with the original waveform corresponding to the block of M source symbols.

Figure 1:
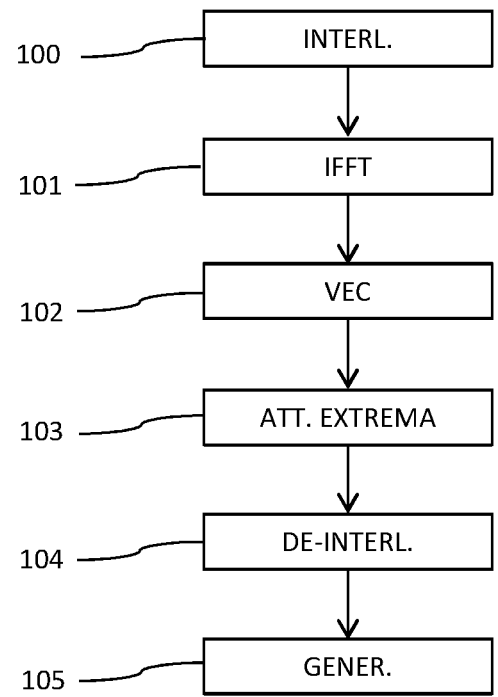
FIG. 1 illustrates the steps of methods for generating and attenuating extrema of an OFDM type multicarrier signal according to different embodiments of the invention.
Figure 2:
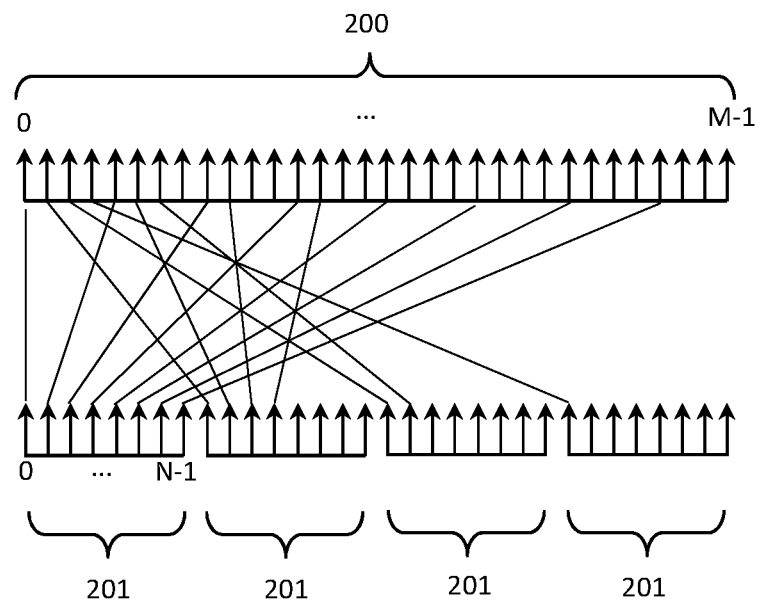
FIG. 2 illustrates the interleaving of the carriers and of the corresponding modulating symbols according to one embodiment of the invention.
Figure 3:
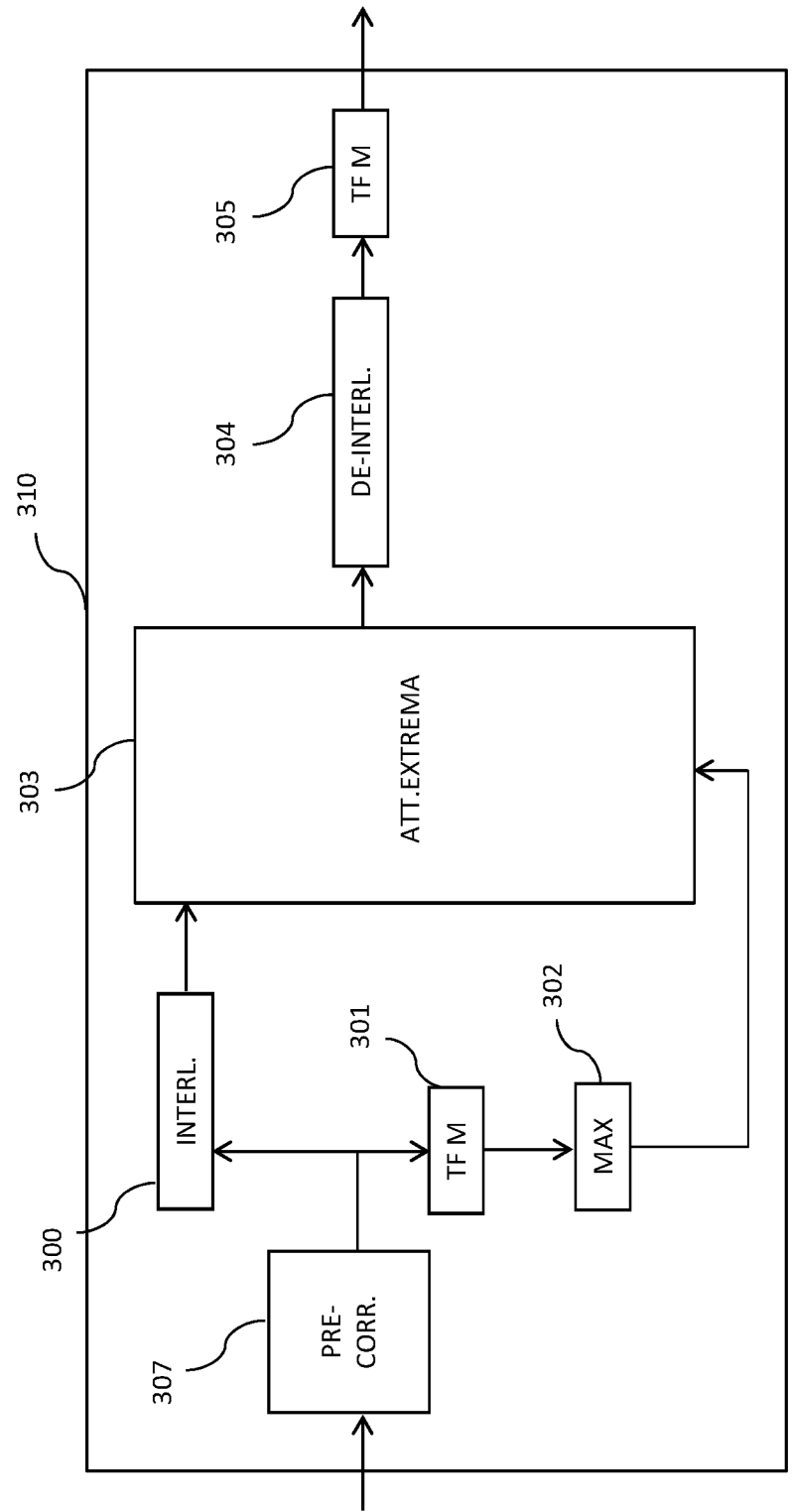
FIG. 3 illustrates a device for generating and attenuating extrema of an OFDM type multicarrier signal according to different embodiments of the invention.

Referring now to FIGS. 1, 2 and 3, a description is provided of a technique for generating an OFDM type multicarrier signal comprising OFDM blocks constituted by M carriers modulated by constellation symbols according to different embodiments of the invention. Such a technique for generating an OFDM signal, implemented in a device for generating a multicarrier OFDM type signal 310, implements an attenuation of the extrema of this signal.

In a step INTERL. 100, a block of M constellation symbols, called source symbols, intended for modulating the M carriers of the corresponding OFDM block, is interleaved by an interleaver 300 so as to obtain the R sub-blocks of N interleaved symbols such that M=R×N, with R, M and N being natural integers.

To this end, it is proposed in one embodiment to observe the expression of the signal obtained at the instant $t=k_M \cdot T_e$, with $T_e$ being the sampling period, $k_M$ being an integer such that $0 \leq k_M < M$, and $M \cdot T_e = T_M$ the period of an OFDM symbol, at output of the inverse discrete Fourier transform of a block of M source symbols $X_m$, with m being an integer ranging from 0 to M−1:

$$x(k_M \cdot Te) = \sum_{m=0}^{M-1} X_m \cdot e^{2 \cdot j \cdot \pi \cdot \frac{m}{M} \cdot k_M}$$

In choosing N as an integer sub-multiple of M, and in taking R=M/N, it is seen that this equation can then be re-written as:

$$x(k_M \cdot Te) = \sum_{n=0}^{N-1} \left[ X_{R \cdot n} \cdot e^{2 \cdot j \cdot \pi \cdot \frac{R \cdot n}{M} \cdot k_M} + X_{R \cdot n+1} \cdot e^{2 \cdot j \cdot \pi \cdot \frac{R \cdot n+1}{M} \cdot k_M} + \ldots + X_{R \cdot n+R-1} \cdot e^{2 \cdot j \cdot \pi \cdot \frac{R \cdot n+R-1}{M} \cdot k_M} \right]$$

or again:

$$x(k_M \cdot Te) = \sum_{n=0}^{N-1} e^{2 \cdot j \cdot \pi \cdot \frac{n}{N} \cdot k_M} \cdot \left[ \begin{array}{c} X_{R \cdot n} + X_{R \cdot n+1} \cdot e^{2 \cdot j \cdot \pi \cdot \frac{1}{M} \cdot k_M} + \ldots + \\ X_{R \cdot n+R-1} \cdot e^{2 \cdot j \cdot \pi \cdot \frac{R-1}{M} \cdot k_M} \end{array} \right]$$

In taking $$\varphi(y, k_M) = e^{2 \cdot j \cdot \pi \cdot \frac{y}{M} \cdot k_M},$$

and with $(k_M \bmod N) = k_N$, $k_N$ being an integer ranging from 0 to N−1, we then obtain the equation (Eq1):

$$x(k_M \cdot Te) = \sum_{n=0}^{N-1} X_{R \cdot n} \cdot e^{2 \cdot j \cdot \pi \cdot \frac{n}{N} \cdot k_N} + \varphi(1, k_M) \cdot \sum_{n=0}^{N-1} X_{R \cdot n+1} \cdot e^{2 \cdot j \cdot \pi \cdot \frac{n}{N} \cdot k_N} +$$

$$\ldots \ldots \ldots \ldots \ldots \ldots \ldots \ldots + \varphi(R-1, k_M) \cdot \sum_{n=0}^{N-1} X_{R \cdot n + R - 1} \cdot e^{2 \cdot j \cdot \pi \cdot \frac{n}{N} \cdot k_N}$$

According to this equation, the signal $x(k_M \cdot T_e)$ can therefore be expressed as the sum of R periodic signals of a period N, weighted by a phase term $\varphi(y, k_M)$; these R signals being derived from an equivalent number of N-sized inverse discrete Fourier transforms carried out on sub-blocks 201 of N source symbols obtained by interleaving of the M source symbols of the original block 200.

More specifically, in this embodiment, the symbol indexed k, k being an integer ranging from 0 to N−1 of the i-th sub-block 201 of N interleaved symbols, i being an integer ranging from 1 to R, corresponds to the symbol indexed (i−1)+k*R of the block of M source symbols 200.

In one variant, the interleaver INTERL. 300 is implemented in the form of a complex matrix interleaver with N lines and M/N=R columns, the latency of which is M clock periods at the frequency $F_e=1/T_e$, the principle of matrix interleaving being that of writing the data to a memory in rows and reading the data in columns.

The interleaver INTERL. 300 then delivers the R sub-blocks of N interleaved symbols with a view to their correction by an attenuator ATT. EXTREME 303.

To this end, in a step IFFT 101, a block of M time domain samples is obtained by a first generator TF M 301 via the inverse discrete Fourier transform of the block of M source symbols.

In one variant, M is expressed as a power of 2, enabling this discrete Fourier transform to be implemented as a fast Fourier transform.

At the step VEC. 102, a peak vector containing N values of maximum amplitude is determined by a peak vector determining module MAX 302 on the basis of the block of M time domain samples delivered by the first generator TF M 301. More particularly, the peak vector determining module MAX 302 comprises a computer of N maximum amplitude values among the M time domain samples delivered by the first generator TF M 301 and a second generator of a vector containing the N maximum amplitudes.

In the embodiment corresponding to the interleaving of the symbols described here above with reference to the equation (Eq1), it can be seen that the amplitudes of the R samples indexed $k_{M0}, k_{M1}, \ldots, k_{MR-1}$ such that $(k_{Mr} \bmod N) = k_N$, r being an integer ranging from 0 to R−1, of the OFDM block obtained by inverse discrete Fourier transform of the block of M source symbols, are all a function of the amplitudes of the samples indexed $k_N$ of the sub-blocks obtained by inverse discrete Fourier transform of the R sub-blocks of N interleaved symbols delivered by the interleaver INTERL. 300 during the step 100.

Thus, if an extremum exists for one of the R samples indexed $k_{M0}, k_{M1}, \ldots, k_{MR-1}$, such that $(k_{Mr} \bmod N) = k_N$, of the OFDM block obtained by inverse discrete Fourier transform of the block of M source symbols, then it can be reduced by action on the value of the samples indexed $k_N$ of the R sub-blocks obtained by inverse discrete Fourier transform of the sub-blocks of N corresponding interleaved symbols.

In this embodiment, the element indexed $k_N$ of the peak vector, where $k_N$ is an integer ranging from 0 to N−1, is equal to the maximum amplitude of the samples indexed $k_N + r^*N$ of the block of M time domain samples, with R being an integer ranging from 0 to R−1.

It can then be seen that, if the element indexed $k_N$ of the peak vector thus defined is above a given threshold, i.e. if the amplitude of one of the samples indexed $k_{M0}, k_{M1}, \ldots, k_{MR-1}$ such that $(k_{Mr} \bmod N) = k_N$ of the OFDM block obtained by inverse discrete Fourier transform of the block of M source symbols is above this given threshold, then this information can be used to deduce a constraint of reduction of amplitude of the samples indexed $k_N$ of the sub-blocks obtained by inverse discrete Fourier transform of the sub-blocks of N corresponding interleaved symbols.

The peak vector thus defined can therefore serve as a constraint vector for a method for reducing extrema by correction of symbols applied to each of the R sub-blocks of N interleaved symbols delivered by the interleaver INTERL. 300 at the step 100.

Thus, at a step ATT. EXTREME 103, the attenuator 303 takes the peak vector determined by the peak vector determining module 302 at the step VEC. 102 as the basis for applying a method for reducing extrema by correction of symbols to each sub-block of N interleaved symbols delivered by the interleaver INTERL. 300 at the step 100. More specifically, in the embodiment described here above with reference to the equation (Eq1), if a maximum amplitude indexed $k_N$ in the peak vector is above a given threshold, the method for reducing extrema will tend to reduce the amplitude of the samples of a same index of the R sub-blocks obtained by inverse discrete Fourier transform of the sub-blocks of N interleaved symbols delivered by the interleaver 300 at the step 100 and will do so in a given ratio relative to this given threshold.

In variants, the method for reducing extrema by correction of symbols applied to each sub-block of N interleaved symbols is a known method, for example belonging to the group:

an ACE (Active Constellation Extension) correction;
a TI-CES (Tone Injection-Constellation Extension Scheme) correction;
a CD (Constellation Distortion) correction;
a TR (Tone Reservation) correction; and
a PCTS (Pre-Constructed Temporal Signal) correction.

The application of the method for reducing extrema by correcting symbols at the R sub-blocks of N interleaved symbols thus leads to the obtaining of R sub-blocks of N corrected interleaved symbols delivered by the attenuator ATT. EXTREMA 303 to a de-interleaver DE-INTERL. 304.

Thus, the attenuator 303 processing the sub-blocks sized N, N being an integer sub-multiple of the size M of the OFDM blocks composing the multicarrier signal considered, the complexity of implementation of the attenuator 303 is reduced relative to an implementation, as encountered in the prior art, that processes he M-sized blocks in their totality.

In a step DE-INTERL. 104, the de-interleaver 304 then carries out an operation that is the reverse of that carried out by the interleaver 300 at the step INTERL. 100 with the aim of delivering a block of M corrected source symbols corresponding to an OFDM block having extrema reduced in comparison with the OFDM block corresponding to the block of M source symbols.

For example, in the embodiment described with reference to the equation (Eq1), it can be seen that the operation that is the reverse of the interleaving operation described with reference to FIG. 2 corresponds to having:

the corrected symbol indexed 0 of the block of M corrected source symbols which corresponds to the corrected symbol indexed 0 of the first sub-block of N corrected symbols;

the corrected symbol indexed 1 of the block of M corrected source symbols that corresponds to the corrected symbol indexed 0 of the second sub-block of N corrected symbols;
...
the corrected symbol indexed R−1 of the block of M corrected source symbols that corresponds to the corrected symbol indexed 0 of the R-th sub-block of N corrected symbols;
the corrected symbol indexed R of the block of M corrected source symbols that corresponds to the corrected symbol indexed 1 of the first sub-block of N corrected symbols;
the corrected symbol indexed R+1 of the block of M corrected source symbols that corresponds to the corrected symbol indexed 1 of the second sub-block of N corrected symbols;
...
the corrected symbol indexed 2*R−1 of the block of M corrected source symbols that corresponds to the corrected symbol indexed 1 of the R-th sub-block of N corrected symbols;
...
the corrected symbol indexed M−1 of the block of M corrected source symbols that corresponds to the corrected symbol indexed N−1 of the R-th sub-block of N corrected symbols.

In other words, if we consider a block of M corrected symbols, called a concatenated block, obtained by the ordered concatenation of the first to the R-th of the R sub-blocks of N corrected symbols, the modified source symbol indexed m, where m is an integer ranging from 0 to M−1, in the block of M modified source symbols corresponds to the corrected symbol indexed (m*N) mod M+⌊(m*N)/M⌋, where ⌊.⌋ designates the integer part in the concatenated block.

The block of M modified source symbols is then delivered to a third generator TF M 305 which, in a step GENER. 105, generates an OFDM block constituted by M carriers modulated by the M modified source symbols through the implementing of an inverse discrete Fourier transform sized M of the block of M modified source symbols. The OFDM block thus generated from the block of M modified source symbols has extrema with amplitude that is reduced in comparison with the OFDM block generated from the block of M original source symbols by the first generator TF M 301.

In one variant, the technique described is applied not directly to a block of M source symbols but to a block M pre-corrected source symbols. Thus, in a preliminary pre-correction step, the pre-correction module PRE-CORR. 307 delivers a block of M pre-corrected source symbols in an intermediate state between the original source symbols and an extreme correction position, this intermediate state corresponding to a correction of the source symbols as permitted by the method for reducing extrema by correction of symbols, implemented in the attenuator 303. Thus, the implementation by the attenuator 303 of the method considered for reducing extrema by correction of symbols is facilitated, thus reducing its convergence time.

Figure 4:
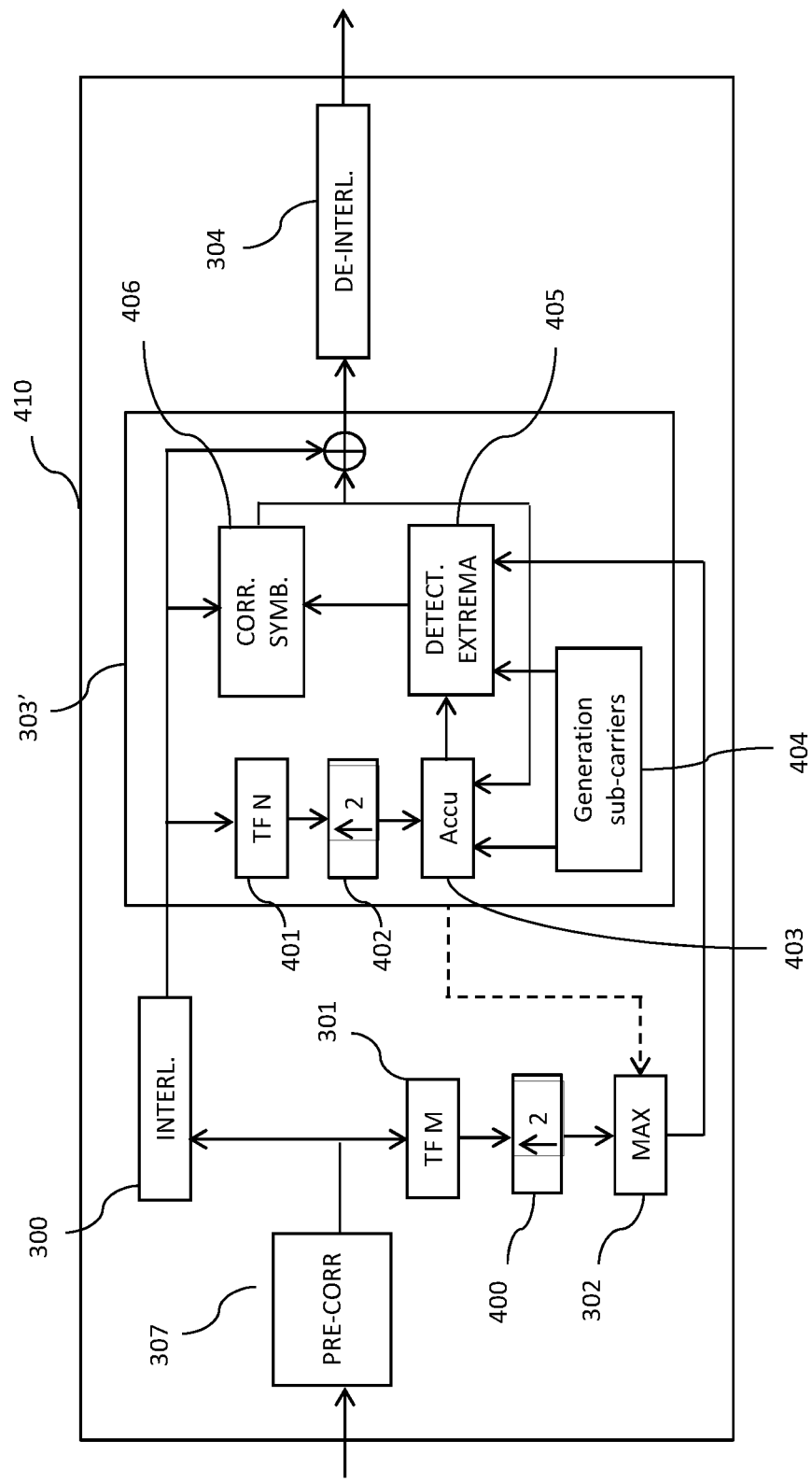
FIG. 4 illustrates a device for attenuating extrema of an OFDM type multicarrier signal according to one particular embodiment of the invention.

Referring to FIG. 4, we shall now describe a device 410 for attenuating extrema of an OFDM type multicarrier signal according to one particular embodiment of the invention.

In this embodiment, the method for reducing extrema by correction of symbols applied to each of the sub-blocks of N interleaved symbols is a PCTS correction method corresponding to the method described extensively in the French patent application published under number FR 3 003 107.

Here the PCTS method implemented in the attenuator 303' successively processes the R sub-blocks of N interleaved symbols delivered by the interleaver INTERL. 300 on the basis of a block of M source symbols. To this end, the attenuator 303' also takes the peak vector delivered by the peak vector determining module 302 as input data. This module 302, as indicated earlier, comprises a computer of N maximum amplitudes among the M time domain samples delivered by the first generator TF M 301 and a second generator of a vector containing these N maximum amplitudes.

In this embodiment, the block of time domain samples delivered by the first generator TF M 301 is over-sampled by a factor of two by a first over-sampling device 400. Indeed, as described in detail in the French patent application FR 3 003 107, the over-sampling of an OFDM signal at a sampling frequency higher than the natural sampling frequency of the discrete Fourier transform used for its generation enables a better representation of the extrema of the corresponding analog signal. The implementing of a method for reducing extrema on the basis of such an over-sampled digital signal in the time domain thus makes it possible to take account of the extrema more efficiently and therefore leads to better results. In this context, the greater the over-sampling, the more accurate is the time domain representation of the extrema and the greater is the extent to which they are taken into account for their reduction as well. However, the greater this over-sampling, the more complex will be the implementation of the processing operation. In practice, it appears that an over-sampling by a factor of two already gives satisfactory results for most applications.

Thus, if we consider an u-th block of M source symbols formed by the symbols $Y_{(u \cdot M)}, Y_{(u \cdot M+1)}, \ldots, Y_{(u \cdot M+M-1)}$, the u-th OFDM block of M corresponding carriers, obtained at output of the first generator TF M 301 at instants that are integer multiples of the sampling period $T_e$, can be expressed as:

$$y((u \cdot M + k_M) \cdot Te) = \sum_{m=0}^{M-1} Y_{(u \cdot M+m)} \cdot e^{2 \cdot j \cdot \pi \cdot \frac{m}{M} \cdot k_M}$$

After over-sampling by a factor of two in the time domain, the first over-sampling device 400 delivers 2*M samples corresponding to the u-th OFDM block taken at the instants that are integer and semi-integer multiples of the sampling period $T_e$.

In one variant, the first over-sampling module 400 is implemented in the form of a linear-phase finite impulse response (FIR) filter so as to obtain a simple implementation that does not cause any phase distortion of the over-sampled signal.

The corresponding over-sampled digital signal is then delivered to the peak vector determining module MAX 302. If we reconsider the embodiment described with reference to FIGS. 1, 2 and 3 and with reference to the equation (Eq1) and if we take account of the present over-sampling, the maximum amplitude indexed l of the peak vector, l being an integer ranging from 0 to 2*N−1, is equal to the maximum amplitude of the samples indexed l+r*2*N of the block of 2*M time domain samples, with R being an integer ranging from 0 to R−1.

Thus, the peak vector determining module MAX 302 delivers a peak vector $MAXM_{u \cdot M}[\ ]$ associated with the u-th block of M source symbols which can be expressed as:

$$\text{MAX}M_{u,M}[\ ] = \begin{bmatrix} \text{MAX}_{r=0}^{R-1}\{|y((u \cdot M + r \cdot N) \cdot Te)|\} \\ \text{MAX}_{r=0}^{R-1}\left\{\left|y\left(\left(u \cdot M + r \cdot N + \frac{1}{2}\right) \cdot Te\right)\right|\right\} \\ \cdots \\ \text{MAX}_{r=0}^{R-1}\{|y((u \cdot M + r \cdot N + l) \cdot Te)|\} \\ \cdots \\ \text{MAX}_{r=0}^{R-1}\left\{\left|y\left(\left(u \cdot M + r \cdot N + \frac{2 \cdot N - 2}{2}\right) \cdot Te\right)\right|\right\} \\ \text{MAX}_{r=0}^{R-1}\left\{\left|y\left(\left(u \cdot M + r \cdot N + \frac{2 \cdot N - 1}{2}\right) \cdot Te\right)\right|\right\} \end{bmatrix}$$

In one variant, the maximum amplitudes of the peak vector are determined by means of two delay lines of a depth N, implemented in the form of a succession of registers clocked at $F_e=1/T_e$, with N intermediate outputs. A first of the two delay lines is associated with the processing of the M samples taken at instants that are integer multiples of the sampling period $T_e$ among the 2*M values delivered by the first over-sampling module or over-sampler 400. The second delay line is then associated with the processing of the M samples taken at instants that are semi-integer multiples i of the sample period $T_e$ among the 2*M values delivered by the first over-sampling module 400. The input of each delay line is the result of the choice of the maximum amplitude made between that of the sample $y((k_N+(r+1)\cdot N+u\cdot M)\cdot Te)$ or $y((k_N+(r+1)\cdot N+u\cdot M+\frac{1}{2})\cdot Te)$, derived from the first over-sampling module 400, and the samples respectively $y((k_N+r\cdot N+u\cdot M)\cdot Te)$ or $y((k_N+r\cdot N+u\cdot M+\frac{1}{2})\cdot Te)$ coming from the output of the two delay lines. Because the delay lines are looped with the function for determining the maximum amplitude disposed at their input and their clocking at $F_e=1/T_e$, their N intermediate outputs deliver the elements of the peak vector as defined here above at the end of the processing of the u-th block of M source symbols.

On the basis of this peak vector associated with a u-th block of M source symbols, the PCTS method implemented in the attenuator 303' successively processes the R sub-blocks of N interleaved symbols delivered by the interleaver INTERL. 300 on the basis of the block of M source symbols formed by the symbols $Y_{(u \cdot M)}, Y_{(u \cdot M+1)}, \ldots, Y_{(u \cdot M+M-1)}$.

Thus, for an r-th sub-block of N interleaved symbols composed of symbols denoted as $X_{(u \cdot M+r \cdot N)}$, $X_{(u \cdot M+r \cdot N+1)}, \ldots, X_{(u \cdot M+r \cdot N+N-1)}$, a time signal corresponding to the inverse discrete Fourier transform of the r-th sub-block of N interleaved symbols is delivered by a Fourier transform module sized N TF N 401. This signal can be expressed at instants that are integer multiples of the sampling period $T_e$ as:

$$x((u \cdot M + r \cdot N + k_M) \cdot Te) = \sum_{n=0}^{N-1} X_{(u \cdot M + r \cdot N + n)} \cdot e^{2 \cdot j \cdot \pi \cdot \frac{n}{N} \cdot k_N}$$

In one variant, N is expressed as a power of two enabling this discrete Fourier transform to be implemented as a fast Fourier transform.

The digital signal $x(\cdot)$ is then over-sampled by a factor of two in the time domain by a second over-sampler 402 which delivers a vector INITN[ ] of 2*N samples corresponding to the r-th sub-block of N interleaved symbols of the u-th OFDM block taken at instants that are integer and semi-integer multiples of the sampling period $T_e$ which is expressed as:

$$\text{INITN}_{(u \cdot M + r \cdot N)}[\ ] = \begin{bmatrix} \sum_{n=0}^{N-1} X_{(u \cdot M + r \cdot N + n)} \\ \sum_{n=0}^{N-1} X_{(u \cdot M + r \cdot N + n)} \cdot e^{2 \cdot j \cdot \pi \cdot \frac{n}{N} \cdot \frac{1}{2}} \\ \cdots \\ \sum_{n=0}^{N-1} X_{(u \cdot M + r \cdot N + n)} \cdot e^{2 \cdot j \cdot \pi \cdot \frac{n}{N} \cdot l} \\ \cdots \\ \sum_{n=0}^{N-1} X_{(u \cdot M + r \cdot N + n)} \cdot e^{2 \cdot j \cdot \pi \cdot \frac{n}{N} \cdot \frac{2 \cdot N - 2}{2}} \\ \sum_{n=0}^{N-1} X_{(u \cdot M + r \cdot N + n)} \cdot e^{2 \cdot j \cdot \pi \cdot \frac{n}{N} \cdot \frac{2 \cdot N - 1}{2}} \end{bmatrix}$$

In one variant, the second over-sampling 402 is implemented in the form of a linear-phase finite impulse response filter, or linear-phase FIR filter so as to obtain an implementation that is simple and does not induce any phase distortion of the over-sampled signal.

The vector INITN[ ], which represents the temporal signal corresponding to the r-th sub-block of N interleaved signal, is then delivered to the accumulation module ACCU 403 in such a way as to gradually pre-build the sequence of 2*N samples of the temporal signal corresponding to the signal obtained after correction of the N interleaved symbols and the application of an inverse discrete Fourier transform on the N corresponding corrected interleaved symbols with interpolation by a factor of two.

To this end, the accumulation module ACCU 403 uses the complex vectors $\text{GEN}_{k_N}[\ ]$ delivered by the generation module 404 and representing the time domain samples corresponding to the $k_N$ order carrier, $k_N$ being an integer ranging from 0 to N−1 at output of the Fourier transform sized N. Thus, the real and imaginary components of $\text{GEN}_{k_N}[\ ]$ are the two vectors $\text{COS}_{k_N}[\ ]$ and $\text{SIN}_{k_N}[\ ]$ expressed, in taking account of the temporal over-sampling by a factor of two, as:

$$\text{COS}_{k_N}[\ ] = \begin{bmatrix} 1 \\ \cos\left(\pi \cdot \frac{k_N}{N}\right) \\ \cdots \\ \cos\left(l \cdot \pi \cdot \frac{k_N}{N}\right) \\ \cdots \\ \cos\left((2 \cdot N - 2) \cdot \pi \cdot \frac{k_N}{N}\right) \\ \cos\left((2 \cdot N - 1) \cdot \pi \cdot \frac{k_N}{N}\right) \end{bmatrix} \text{ and}$$

$$SIN_{k_N}[\ ] = \begin{bmatrix} 0 \\ \sin\left(\pi \cdot \frac{k_N}{N}\right) \\ \ldots \\ \sin\left(l \cdot \pi \cdot \frac{k_N}{N}\right) \\ \ldots \\ \sin\left((2 \cdot N - 2) \cdot \pi \cdot \frac{k_N}{N}\right) \\ \sin\left((2 \cdot N - 1) \cdot \pi \cdot \frac{k_N}{N}\right) \end{bmatrix}$$

On one variant, the elements of the two vectors $COS_{k_N}[\ ]$ and $SIN_{k_N}[\ ]$ are pre-computed and stored in a memory. In another variant, these values are computed on the fly, for example by means of a CORDIC type algorithm well known to those skilled in the art.

The accumulation module ACCU 403 then also takes account of the complex correction shifts $dX_{u \cdot M + r \cdot N + k_N} = dA_{u \cdot M + r \cdot N + k_N} + j \cdot dB_{u \cdot M + r \cdot N + k_N}$, delivered by the PCTS correction module CORR. SYMB. 406 and to be applied to the symbol $X_{u \cdot M + r \cdot N + k_N}$ that are intended for modulating the corresponding $k_N$ order carriers of the r-th sub-block of the u-th OFDM block. A signal vector $dN_{(u \cdot M + r \cdot N + k_N)}[\ ]$, associated with the $k_N$ order carrier modulated by the shift $dX_{u \cdot M + r \cdot N + k_N}$ is then determined with the following expression:

$$dN_{(u \cdot M + r \cdot N + k_N)}[\ ] = (dA_{u \cdot M + r \cdot N + k_N} + j \cdot dB_{u \cdot M + r \cdot N + k_N}) \cdot GEN_{k_N}[\ ]$$

A complex signal vector $ACC_{(u \cdot M + r \cdot N + k_N)}[\ ]$ corresponding to the partial sum of the carriers modulated by the corrected symbols up to the $k_N - 1$ order is thus obtained with the following expression for $k_N \neq 0$:

$$ACC_{(u \cdot M + r \cdot N + k_N)}[\ ] = INITN_{(u \cdot M + r \cdot N)}[\ ] + \sum_{n=0}^{k_N - 1} dN_{(u \cdot M + r \cdot N + n)}[\ ]$$

From this we deduce the vector $PREC_{(u \cdot M + r \cdot N + k_N)}[\ ]$ that is delivered by the accumulation module ACCU 403 to the PCTS extrema detection module DETECT. EXTREMA 405 and is expressed as follows:

$$PREC_{(u \cdot M + r \cdot N + k_N)}[\ ] = \begin{cases} INITN_{(u \cdot M + r \cdot N)}[\ ] & \text{when } k_N = 0 \\ ACC_{(u \cdot M + r \cdot N + k_N)}[\ ] & \text{else} \end{cases}$$

Thus, the vector $PREC_{(u \cdot M + r \cdot N + k_N)}[\ ]$ represents the partial sum of the $k_N$ first carriers of the r-th sub-block of the u-th OFDM block, these carriers being modulated by the corrections of symbols preliminarily determined during the previous iterations of orders below $k_N$.

It can be seen that the vector $PREC_{(u \cdot M + r \cdot N + k_N)}[\ ]$ thus defined represents the sub-block of N time domain samples corresponding to the inverse Fourier transform of the sub-block of N corrected symbols? determined by the application of the PCTS method for reducing extrema TO the r-th sub-block of interleaved symbols when $k_N = N - 1$, i.e. after the last iteration of the PCTS algorithm applied to the r-th sub-block of N interleaved symbols considered.

Besides, according to the principle of the PCTS algorithm as described in the French patent application FR 3 003 107, the partial sum defining the vector $PREC_{(u \cdot M + r \cdot N + k_N)}[\ ]$ makes it possible to take account of the effects of the corrections made to the symbols modulating the carriers of an order below a given order to determine the correction to be made to the symbol modulating the carrier at this same given order.

To this end, the PCTS extrema detection module DETECT. EXTREMA 405 carries out a thresholding operation on the vector $PREC_{(u \cdot M + r \cdot N + k_N)}[\ ]$ so as to deliver a vector representing extrema present in the signal corresponding to the partial sum described here above to enable the PCTS correction module CORR. SYMB. 406 to determine the correction to be made to the symbol that is meant to modulate the next-order carrier.

More specifically, in this embodiment, the PCTS extrema detection module DETECT. EXTREMA 405 delivers a vector $DETECT_{(u \cdot M + r \cdot N + k_N)}[\ ]$ to the PCTS correction module CORR. SYMB. 406. The element indexed l of this vector $DETECT_{(u \cdot M + r \cdot N + k_N)}[\ ]$ is expressed through the equation (Eq2):

$$DETECT_{(u \cdot M + r \cdot N + k_N, l)} = \begin{cases} \left( \gamma_{(u \cdot M, l)} \cdot \frac{|PREC_{(u \cdot M + r \cdot N + k_N, l)}|}{|INITN_{(u \cdot M + r \cdot N, l)}|} - 1 \right) \cdot PREC_{(u \cdot M + r \cdot N + k_N, l)} & \text{when } \gamma_{(u \cdot M, l)} \cdot \frac{|PREC_{(u \cdot M + r \cdot N + k_N, l)}|}{|INITN_{(u \cdot M + r \cdot N, l)}|} \geq 1 \\ 0 & \text{else} \end{cases}$$

with: $\gamma_{(u \cdot M, l)} = \left( \frac{|MAXM_{(u \cdot M, l)}|}{\alpha} \right)$ The PCTS correction module CORR. SYMB. 406 then determines the correction $dX_{u \cdot M + r \cdot N + k_N} = dA_{u \cdot M + r \cdot N + k_N} + j \cdot dB_{u \cdot M + r \cdot N + k_N}$, to be applied to the symbol $X_{u \cdot M + r \cdot N + k_N}$ intended for the modulation of the $k_N$ order carrier of the r-th sub-block of the u-th OFDM block in requiring it to be proportional to the product of correlation between the vector $DETECT_{(u \cdot M + r \cdot N + k_N)}[\ ]$ delivered by the PCTS extrema detection module 405 and the $k_N$ order carrier, i.e.:

$$dX_{k_N} = -\mu SIGCORR_{(u \cdot M + r \cdot N + k_N)}$$

where $\mu > 0$ and:

$$SIGCORR_{(u \cdot M + r \cdot N + k_N)} = \sum_{l=0}^{2 \cdot N - 1} DETECT_{(u \cdot M + r \cdot N + k_N, l)} \cdot GEN^*_{(k_N, l)}$$

Referring now to FIGS. 7a and 7b, we describe the gains obtained in terms of numbers of logic gates and memory size needed to implement a PCTS extrema reducing method by using the technique described.

More particularly, the reduction of complexity of the algorithm implemented will depend on the ratio M/N=R.

This reduction will be all the greater as this ratio is high. Nevertheless, this reduction of complexity when M/N increases reaches limits related to a reduction of the efficiency of the technique described. This is because all the N detected maximum values of the peak vector $MAXM_{u \cdot M}[\ ]$ associated with the u-th block of M source symbols, are correspondingly greater at initialization and correspondingly closer to the threshold value imposed. Indeed, each maximum value results from the comparison of R samples with one another and this value becomes, on average, all the higher as R is great. This therefore makes it necessary to raise the threshold value so that the algorithm can continue to work accurately but therefore to the detriment of the reduction of the final PAPR that is obtained.

It is therefore worthwhile assessing the ratio M/N=R that offers the reduction that is the best trade-off. Should M and N be expressed as powers of two, the ratio M/N=R can advantageously be taken into account through the parameter $\beta$ defined by the relationship $q=ceil(\beta p)$ with $1/2<\beta<1$, $M=2^p$ and $N=2^q$.

FIGS. 7a and 7b then represent, on a logarithmic scale, the compared complexities, respectively in terms of logic cells and of memory, of the two algorithms, i.e. the PCTS algorithm alone (curves 71a, 71b) and the PCTS algorithm encapsulated in the method described as well as the complexities of the corresponding FFT (curves 70a, 70b–FFT size M alone) taken as references for two values of $\beta$: $2/3$ (curves 72a, 72b–PCTS and decimation FFT–Beta=$2/3$) and $3/4$ (curves 73a, 73b–PCTS and decimation FFT–Beta=$3/4$).

It can be seen that the reduction of complexity becomes very great when $\beta$ becomes smaller than $3/4$. The result of this is that a satisfactory trade-off can be obtained when $\beta$ is in the region of $2/3$; for this value we then obtain the values of M, N and R as given in Table 1.

TABLE 1

| M | 16 | 64 | 256 | 1024 | 2048 | 8192 | 32768 |
|---|----|----|-----|------|------|------|-------|
| N | 8  | 16 | 64  | 128  | 256  | 512  | 1024  |
| R | 2  | 4  | 4   | 8    | 8    | 16   | 32    |

Figure 5A:
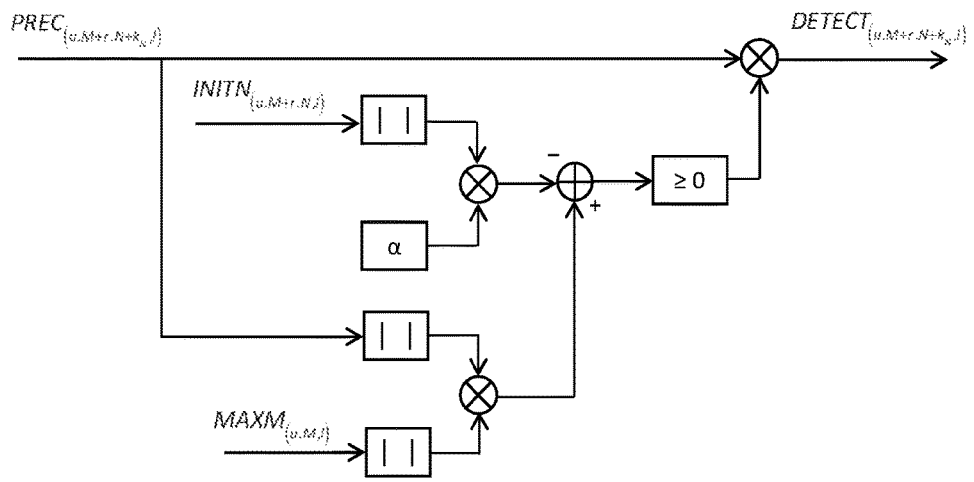
FIGS. 5a and 5b illustrate variants of implementation of the methods for generating and attenuating extrema according to different embodiments of invention.
Figure 5B:
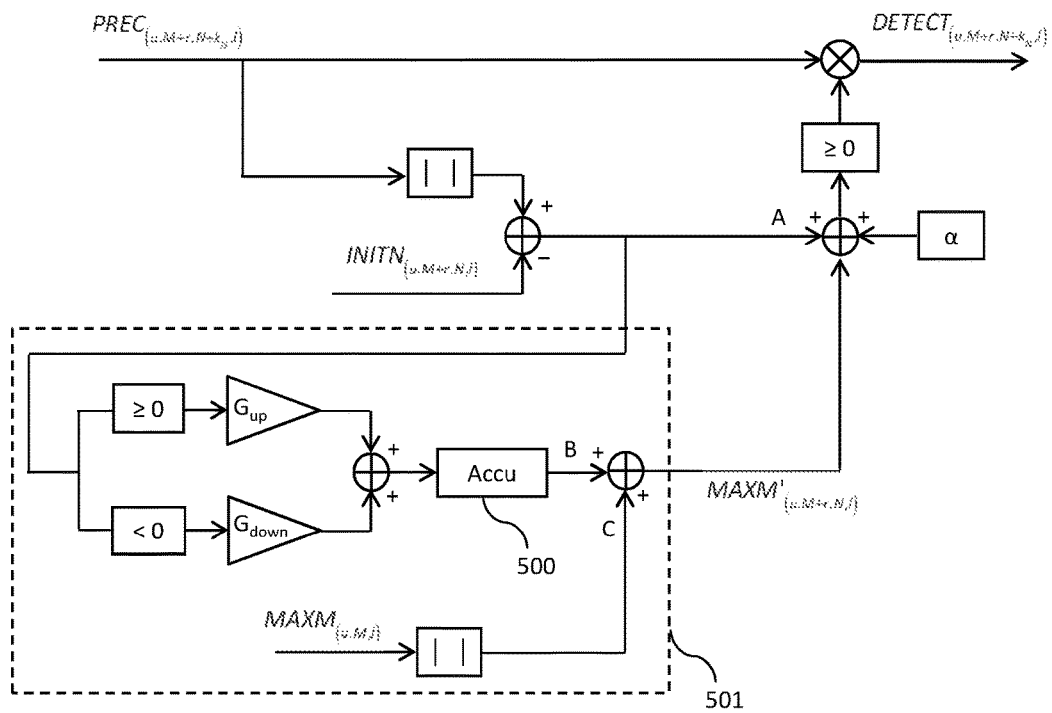

Referring now to FIGS. 5a and 5b, we describe alternative modes of implementation of methods for generating and attenuating extrema according to different embodiments of the invention.

It can be seen indeed, in the embodiment described with reference to FIG. 4, that the equation (Eq2) brings into play divisions and is therefore complex to implement.

FIG. 5a then presents an alternative in which the element indexed l of the vector $DETECT_{(u \cdot M+r \cdot N+k_N)}[\ ]$ is expressed as the product of the element indexed l of the vector $PREC_{(u \cdot M+r \cdot N+k_N)}[\ ]$ and of a weighting factor equal to the maximum of 0 and of $|MAXM_{(u \cdot M,l)}| \cdot |PREC_{(u \cdot M+r \cdot N+k_N,l)}| - \alpha \cdot |INITN_{(u \cdot M+r \cdot N,l)}|$.

The same thresholding effect as the one sought via the equation (Eq2) is thus obtained but without any need to apply functions that are costly in terms of computation load such as division for example.

Besides, it can be seen that the correction of the interleaved symbols obtained by the successive application of the method for attenuating extrema at each sub-block of N interleaved symbols can, in addition to minimizing extrema present in original peak vector, leads to the generation of new extrema of the corresponding OFDM block that are not present in the original peak vector and therefore not taken into account by default during the application of the method for attenuating extrema in each of the sub-blocks of N interleaved symbols.

In the embodiment described with reference to FIGS. 1, 2 and 3, this generation is linked to the coherent summing of the sub-blocks of time domain samples corresponding to the inverse discrete Fourier transforms of the R sub-blocks of N corrected symbols as given by the equation (Eq1). More specifically, there can thus be a refreshing of one or more signal peaks in samples indexed $k_M$ of the OFDM block considered because of the consistent summing of the R samples indexed $k_N$ of these sub-blocks of time domain samples corresponding to the corrected symbols.

Thus, in one embodiment, it is proposed that the peak vector should be updated between each iteration and the next of the method for reducing extrema by shifting of symbols so as to take account of the potential generation of new extrema as and when the sub-blocks of N interleaved symbols are corrected.

To this end, the invention proposes that the method for reducing extrema should be based not directly on the original peak vector m $MAXM_{u \cdot M}[\ ]$ delivered by the module for determining peak vectors 302 but on a peak vector $MAXM'_{u \cdot M+r \cdot N}[\ ]$ updated at the end of the processing of the r-th sub-block of N interleaved symbols of the u-th block of M source symbols by the attenuator 303' and proposes to take account of it in the processing of the r+1th following sub-block.

It can be seen from the diagram illustrated in FIG. 5b that when the processing is initialized, i.e. when the method described is applied to a new block of M source symbols, for example the u-th block, the correction made to the original peak vector $MAXM_{(u \cdot M)}[\ ]$ is null. In the embodiment described with reference to FIG. 4, where the method for reducing extrema applied to the sub-blocks of interleaved symbols is a PCTS method, the element indexed l of the vector $DETECT_{(u \cdot M+r \cdot N+k_N)}[\ ]$ then depends solely on the element indexed l of the original peak vector $MAXM_{(u \cdot M,l)}$ relative to the imposed threshold $\alpha$ (null signals of the arms A and B). Then, during the processing of the first sub-block of N interleaved symbols by the attenuator 303', the variation of amplitude of the sample indexed l is taken into account in the combination of the signal of the arm A with that of the arm C.

At the end of the processing of the first sub-block of N interleaved symbols by the attenuator 303', the variation of the amplitude of the sample indexed l, corresponding to the inverse discrete Fourier transform of the sub-block of N corrected interleaved symbols, relative to its initial state given by the amplitude of the sample indexed l of the vector $INITN_{(u \cdot M+1 \cdot N)}$, is memorized in an accumulator ACCU 500, having been preliminarily weighted differently depending on its sign.

Thus, in alternative embodiments, the variation of the amplitude of the sample relative to its initial value is accounted for with a factor Gup that is equal to 1.0 when it has been amplified because it could potentially be summed constructively with other same-index samples of the R–1 other sub-blocks. The variation is accounted for with a factor Gdown that is equal to 0.707 when it is attenuated, corresponding to a root-square summing (square-root contribution of the sum of the squares of the module) with the amplitude of other same-order samples, so as not to overestimate the impact, on the final signal, of the reduction obtained.

At the beginning of the processing of the second sub-block of N interleaved symbols by the attenuator 303', the signal output from the arm B therefore takes account of the previously made correction.

Thus, with the accumulator ACCU 500 being re-updated at the end of the processing of each sub-block of N interleaved symbols, the updated peak vector MAXM'$_{u·M+R·N}$[ ] resulting from the summing of the arms B and C, gives an estimation, after the processing of the R sub-blocks of the N interleaved symbols, of the amplitude of the samples in the time domain of the u-th OFDM block corresponding to the inverse discrete Fourier transform of the block of M corresponding corrected source symbols.

Besides, the accumulator ACCU 500 is then set at zero at the end of the processing by the attenuator 303', of the last sub-block of N interleaved symbols of a block of M source symbols given with a view to processing the next block of M source symbols.

In one variant, the peak vector updating module 501 is implemented directly in the peak vector determining module MAX 302. Indeed, it can be seen that the peak vector updating module 501 requires only the final result of the processing of each of the R sub-blocks of N interleaved symbols by the attenuator 303' to update the peak vector (this result can be obtained through the implementing of any method for attenuating extrema by the correction of symbols). This processing result can then be transmitted by the attenuator 303' to the peak vector determining module MAX 302.

Figure 6:
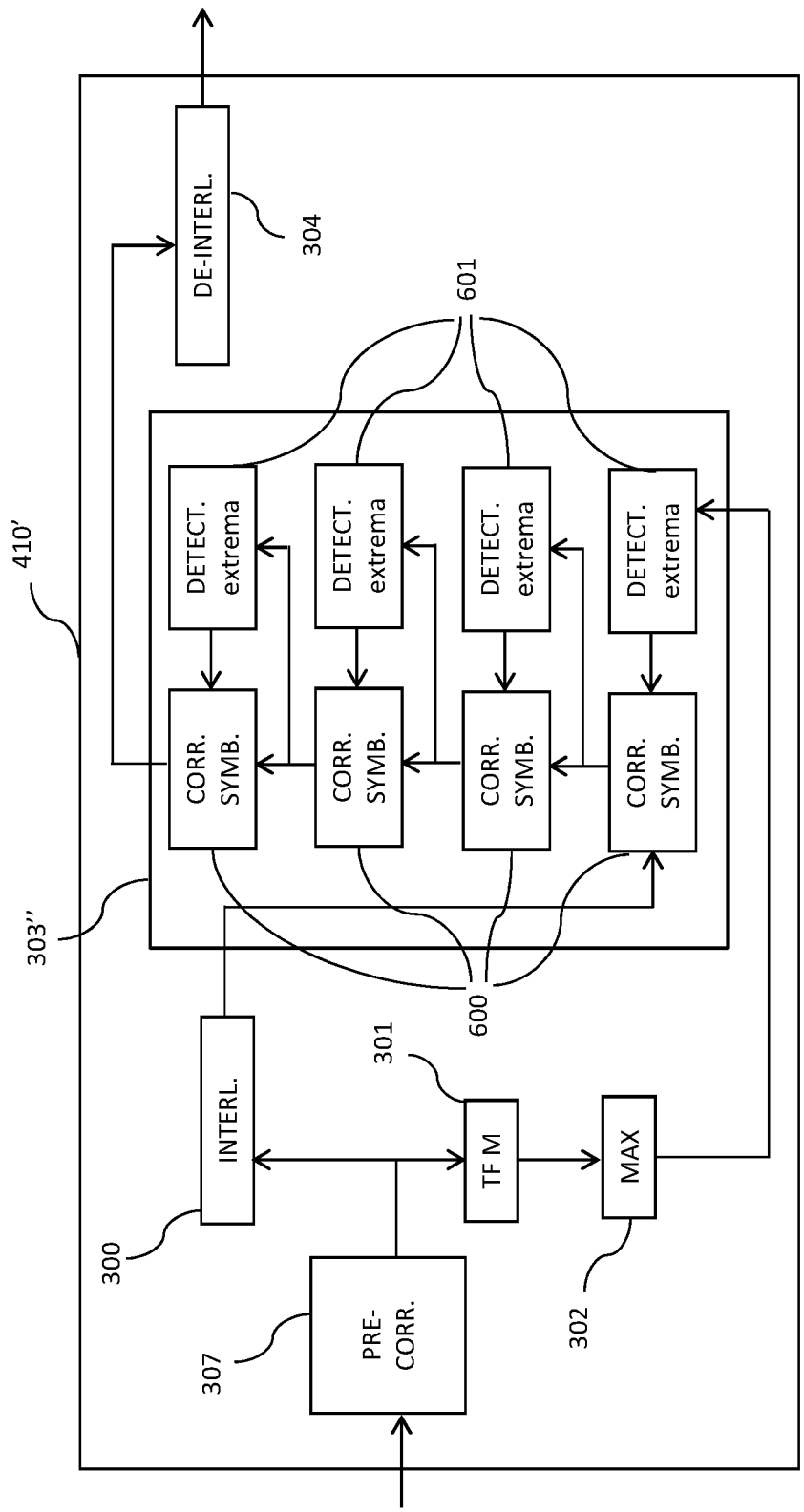
FIG. 6 illustrates a device for attenuating extrema of an OFDM type multicarrier signal according to another particular embodiment of the invention.

Referring now to FIG. 6, we describe a device 401' for attenuating the extrema of an OFDM type multicarrier signal according to one particular embodiment of the invention.

In this embodiment, the method for reducing extrema implemented by the attenuator 303" is a method using ACE symbol correction.

The ACE method is especially recommended in the DVB-T2 standard and the standardizing document *ETSI EN 302 755 V1.3.1 (2012-04) Digital Video Broadcasting (DVB); Frame structure channel coding and modulation for a second generation digital terrestrial television broadcasting system (DVB-T2)* which describes the corresponding functions that have to be implemented.

These functions include the two main functions of detecting extrema of the OFDM block to which the method is applied and correcting the corresponding symbols. These functions are implemented respectively in an ACE correction module CORR. SYMB. 600 and in an extrema detection module ACE DETECT. EXTREMA 601.

The ACE method has the particular feature of being iterative, which means that, for a real-time implementation, operation at higher frequency can only very partially be enough to compensate for the time needed to carry out all the indispensable iterations (5 to 20 for significant results) to obtain an acceptable level of extrema reduction. The algorithm must therefore be partly or entirely deployed in the context of a real-time application and the two functions of extrema detection DETECT. EXTREMA and correction CORR. SYMB. are then duplicated and cascaded over multiple levels.

Thus, an example of application of the ACE algorithm with four iterations is represented in FIG. 6 in which the method of processing in sub-blocks of N interleaved symbols, as described in the present patent application, is applied.

The Table 2 then presents the complexity and the compared latency of the direct implementation of the ACE method as recommended in the DVB-T2 and that of the ACE method to which the method of processing in sub-blocks, as illustrated in FIG. 6, is applied.

This complexity is accounted for in terms of numbers of discrete Fourier transforms (implemented in FFT form here) that have to be computed to process an OFDM block of M carriers modulated by M source symbols. This is done for three values of M (M=64, 2048 and 8192). Besides, three values of a decimation factor R used to determine the sub-blocks of N interleaved symbols are also considered (R=4, 8 and 16).

It may be recalled that the computational complexity of an FFT of size M develops according to M·Log(M), and all the interleaving functions and de-interleaving functions or detection functions needed to apply the claimed method as assessed as having a complexity equivalent to 0.5 FFT sized M.

The latency for its part is accounted for relative to the latency $L_M$, corresponding to the time taken to compute an FFT sized M implemented in a same technology.

TABLE 2

| Algorithm | ACE alone (4 Iterations) | ACE with the claimed method (4 Iterations) | ACE alone (4 Iterations) | ACE with the claimed method (4 Iterations) | ACE alone (4 Iterations) | ACE with the claimed method (4 Iterations) |
|---|---|---|---|---|---|---|
| M | 64 | 64 | 2048 | 2048 | 8192 | 8192 |
| R | 1 | 4 | 1 | 8 | 1 | 16 |
| N | 64 | 16 | 2048 | 256 | 8192 | 512 |
| Number of FFT sized M | 8 | 1.5 | 8 | 1.5 | 8 | 1.5 |
| Number of FFT sized N | — | 8 | — | 8 | — | 8 |
| Complexity | 100% | ≤40% | 100% | ≤30% | 100% | ≤25% |
| Latency | 8 · $L_M$ | 5 · $L_M$ | 8 · $L_M$ | 4 · $L_M$ | 8 · $L_M$ | 3.5 · $L_M$ |

Thus, a very significant reduction of complexity of implementation is noted all the more so as M and R are high, but there is also a substantial reduction of latency of the algorithm.

Table 3 shows the same comparisons made for 8 iterations, this time for the algorithm ACE. It can be seen that, for a larger number of iterations, the gains in reduction of complexity and in latency are even greater.

TABLE 3

| Algorithm | ACE alone (8 Iterations) | ACE with the claimed method (8 Iterations) | ACE alone (8 Iterations) | ACE with the claimed method (8 Iterations) | ACE alone (8 Iterations) | ACE with the claimed method (8 Iterations) |
|---|---|---|---|---|---|---|
| M | 64 | 64 | 2048 | 2048 | 8192 | 8192 |
| R | 1 | 4 | 1 | 8 | 1 | 16 |
| N | 64 | 16 | 2048 | 256 | 8192 | 512 |
| Number of FFT sized M | 16 | 1.5 | 16 | 1.5 | 16 | 1.5 |
| Number of FFT sized N | — | 16 | — | 16 | — | 16 |
| Complexity | 100% | ≤26% | 100% | ≤20% | 100% | ≤15% |
| Latency | $16 \cdot L_M$ | $7 \cdot L_M$ | $16 \cdot L_M$ | $5 \cdot L_M$ | $16 \cdot L_M$ | $4 \cdot L_M$ |

It can thus be seen that, for a broadcasting application according to the DVBT2 standard based on an OFDM modulation using 32768 carriers (M=32768) and for which the factor R can be equal to 32, i.e. with the technique described implementing an ACE sub-module using a Fourier transform on 1024 interleaved symbols (N=1024), the expected gains in complexity and in latency are very great.

In one variant, the technique described is applied not directly to a block of M source symbols but to a block of M source symbols pre-corrected by the pre-correction module PRE-CORR. 307. According to the present embodiment corresponding to an attenuator 303' implementing an ACE method by correction of symbols, this intermediate state corresponds to a shifting of the source symbols towards the exterior of the constellation relative to their initial value, i.e. a shifting of the symbols away from the center of the constellation. Indeed, the ACE algorithm tends to search for the minimum values of power of the modulated signal, the consequence of which is to hamper the shifting of the correction symbols towards the exterior of the constellation during the correction of peaks of greater dynamic range. Thus, the pre-correction of the source symbols by the pre-correction module PRE-CORR. 307 takes account of this phenomenon of resistance to shifts towards the exterior of the constellation by pre-positioning the symbols at a pre-determined position between their initial position and an extreme correction position, thus improving the speed of convergence of the overall method.

FIGS. 8a, 8b and 8C present examples of structures of a device 310 for generating an OFDM type multicarrier signal as well as attenuating the extrema 410, 410' of an OFDM type multicarrier signal enabling the implementing of a method described with reference to FIG. 1.

The generating device 310 as well as the device for attenuating extrema 410, 410' comprise a random-access memory (a RAM) 803, 813, 823, a processing unit 802, 812, 822 equipped for example with a processor and driven by a computer program stored in a read-only memory 801, 811, 821 (a ROM or a hard-disk drive). At initialization, the code instructions of the computer program are for example loaded into the random-access memory 803, 813, 823 and then executed by the processor of the processing unit 802, 812, 822.

These FIGS. 8a, 8b and 8c illustrate only one particular way among several possible ways of making the generating device 310 as well as the device for attenuating extrema 410, 410' so that they can carry out certain steps of the method described in detail here above with reference to FIG. 1 (in any one of the different embodiments). Indeed, these steps can be carried out equally well on a reprogrammable computation machine (a PC computer, a DSP processor or a microcontroller) executing a program comprising a sequence of instructions or on a dedicated computing machine (for example a set of logic gates such as an FPGA or an ASIC or any other hardware module).

Should the generating device 310 and/or the device for attenuating extrema 410, 410' be made with a pre-programmable computing machine, the corresponding program (i.e. the sequence of instructions) could be stored in a detachable storage medium (such as for example a floppy disk, a CD-ROM or a DVD-ROM) or non-detachable storage medium, this storage medium being partially or totally readable by a computer or a processor.

The invention claimed is:

1. A method for generating an OFDM type multicarrier signal comprising OFDM blocks constituted by M carriers modulated by constellation symbols, called source symbols, a block of M source symbols corresponding to an OFDM block of M carriers, wherein the method comprises the following acts performed by a signal generating device:
   interleaving the M symbols of a block of source symbols into R sub-blocks of N interleaved symbols, where R, M and N are natural integers such that M=R×N;
   obtaining a block of M time domain samples by discrete Fourier transform of said block of M source symbols;
   determining N maximum amplitudes among said samples of said block of M time domain samples and forming a vector containing said N maximum amplitudes, called a peak vector;
   attenuation, by correction of constellation symbols, of extrema of a sub-block of N time domain samples corresponding to the discrete Fourier transform of one of said R sub-blocks of N interleaved symbols, said correction taking account of at least said peak vector and delivering a sub-block of N corrected interleaved symbols,
   said step of attenuation, repeated for each sub-block among said R sub-blocks of N interleaved symbols, delivering R sub-blocks of N corrected interleaved symbols;
   de-interleaving said R sub-blocks of N corrected interleaved symbols delivering a block of M corrected source symbols; and
   generating an OFDM block of said multicarrier signal by discrete Fourier transform of said block of M corrected source symbols.

2. The method for generating according to claim 1, characterized in that, during said step for interleaving the M symbols of a block of source symbols into R sub-blocks of N interleaved symbols, an i-th sub-block of N interleaved symbols, where i is an integer ranging from 1 to R, comprises symbols indexed (i−1)+k*R of said block of source symbols, k being an integer ranging from 0 to N−1.

3. The method for generating according to claim 1, wherein an element indexed j of said peak vector, where j is an integer ranging from 0 to N−1, is equal to said maximum amplitude of the samples indexed j+r*N of said block of M time domain samples with r an integer ranging from 0 to R−1.

4. The method for generating according to claim 1, wherein R>1 and wherein said attenuating extrema by correction of constellation symbols is done successively for each of said R sub-blocks of N interleaved symbols, and wherein:
   said attenuating, performed for the sub-blocks 1 to v−1 of N interleaved symbols, where v is an integer ranging from 2 to R, delivers v−1 sub-blocks of N corrected interleaved symbols;
   when said attenuating is performed for a v-th sub-block of N interleaved symbols, the peak vector taken into account by the correction is updated as a function of an amplitude of at least one time domain sample among v−1 sub-blocks of N corrected interleaved time domain samples corresponding to the discrete Fourier transform of said v−1 sub-blocks of N preliminarily obtained corrected interleaved symbols.

5. The method for generating according to claim 4, said attenuating is performed for said v-th sub-block of N interleaved symbols, said updating of said peak vector taken into account by said correction corresponds, for an element indexed s of said peak vector, s being an integer ranging from 0 to N−1, to:
   an incrementing of said element indexed s by a value corresponding to a difference, weighted by first corrective factor Gup, between an amplitude of a sample indexed s of a sub-block of N corrected interleaved time domain samples corresponding to the discrete Fourier transform of said sub-block ranked v−1 of N preliminarily obtained, corrected interleaved symbols and an amplitude of a sample indexed s of a sub-block of N interleaved time domain samples corresponding to the discrete Fourier transform of said sub-block ranked v−1 of N interleaved symbols when said difference is positive or null;
   a decrementing of the element indexed s by a value corresponding to said difference weighted by a second corrective factor Gdown when said difference is negative.

6. The method for generating according to claim 5, wherein said first corrective factor Gup is equal to 1 and said second corrective factor Gdown is equal 0.707.

7. The method for generating according to claim 1, wherein, at the end of said obtaining a block of M time domain samples by discrete Fourier transform of said block of M source symbols, the device implements an act of over-sampling of said block of M time domain samples obtained.

8. The method for generating according to claim 1 wherein said attenuating the extrema by correction of the constellation symbols implements a correction belonging to the group consisting of:
   an ACE (Active Constellation Extension) correction;
   a TI-CES (Tone Injection-Constellation Extension Scheme) correction;
   a CD (Constellation Distortion) correction;
   a TR (Tone Reservation) correction; and
   a PCTS (Pre-Constructed Temporal Signal) correction.

9. The method for generating according to claim 1, wherein the method further comprises a preliminary act of pre-correction of said block of M source symbols, a source symbol being pre-corrected by a pre-defined intermediate correction value between a zero correction value and an extreme correction value.

10. A method for attenuating extrema of an OFDM type multicarrier signal, the method comprising the following acts performed by an attenuating device:
   attenuating, by correction of constellation symbols, of extrema of a block of M time domain samples corresponding to a discrete Fourier transform of a block of N constellation symbols, said correction taking account of a peak vector representing extrema of said multicarrier signal and delivering a block of N corrected symbols;
   wherein said OFDM type multicarrier signal comprises OFDM blocks constituted by M carriers modulated by constellation symbols, called source symbols, a block of M source symbols corresponding to an OFDM block of M carriers:
      said block of N constellation symbols is a sub-block among R sub-blocks of N interleaved symbols obtained by interleaving of M symbols of a block of source symbols, where R, M and N are natural integers such that M=R×N;
      said peak vector is obtained by determining N maximum amplitudes among time domain samples obtained by discrete Fourier transform of said block of M source symbols; and
   de-interleaving R sub-blocks of N corrected interleaved symbols, obtained by repetition of said act of attenuating, for each block of N constellation symbols among said R sub-blocks of N interleaved symbols.

11. A non-transitory computer-readable medium comprising a computer program product stored thereon, comprising program code instructions for implementing a method for generating an OFDM type multicarrier signal, when said instructions are executed by a processor of a signal generating device, wherein the OFDM type multicarrier signal comprises OFDM blocks constituted by M carriers modulated by constellation symbols, called source symbols, a block of M source symbols corresponding to an OFDM block of M carriers, and wherein the method comprises the following acts performed by the signal generating device:
   a step for interleaving the M symbols of a block of source symbols into R sub-blocks of N interleaved symbols, where R, M and N are natural integers such that M=R×N;
   obtaining a block of M time domain samples by discrete Fourier transform of said block of M source symbols;
   determining N maximum amplitudes among said samples of said block of M time domain samples and forming a vector containing said N maximum amplitudes, called a peak vector;
   attenuation, by correction of constellation symbols, of extrema of a sub-block of N time domain samples corresponding to the discrete Fourier transform of one of said R sub-blocks of N interleaved symbols, said correction taking account of at least said peak vector and delivering a sub-block of N corrected interleaved symbols,
      said step of attenuation, repeated for each sub-block among said R sub-blocks of N interleaved symbols, delivering R sub-blocks of N corrected interleaved symbols;

de-interleaving said R sub-blocks of N corrected interleaved symbols delivering a block of M corrected source symbols; and generating an OFDM block of said multicarrier signal by discrete Fourier transform of said block of M corrected source symbols.

12. A non-transitory computer-readable medium comprising a computer program product stored thereon, comprising program code instructions for implementing a method for attenuating extrema of an OFDM type multicarrier signal, when the instructions are executed by a processor of an attenuating device, wherein the method comprises:

attenuating, by correction of constellation symbols, of extrema of a block of M time domain samples corresponding to a discrete Fourier transform of a block of N constellation symbols, said correction taking account of a peak vector representing extrema of said multicarrier signal and delivering a block of N corrected symbols;

wherein said OFDM type multicarrier signal comprises OFDM blocks constituted by M carriers modulated by constellation symbols, called source symbols, a block of M source symbols corresponding to an OFDM block of M carriers:

said block of N constellation symbols is a sub-block among R sub-blocks of N interleaved symbols obtained by interleaving of M symbols of a block of source symbols, where R, M and N are natural integers such that M=R×N;

said peak vector is obtained by determining N maximum amplitudes among time domain samples obtained by discrete Fourier transform of said block of M source symbols; and de-interleaving R sub-blocks of N corrected interleaved symbols, obtained by repetition of said act of attenuating, for each block of N constellation symbols among said R sub-blocks of N interleaved symbols.

13. A device for generating an OFDM type multicarrier signal comprising OFDM blocks constituted by M carriers modulated by constellation symbols, called source symbols, a block of M source symbols corresponding to an OFDM block of M carriers, wherein the device comprises:

an interleaver of M symbols of a block of source symbols into R sub-blocks of N interleaved symbols where, R, M and N are natural integers such that M=R×N;

a first generator of a block of M temporary samples by discrete Fourier transform of said block of M source symbols;

a computer of N maximum amplitudes among the samples of said block of M time domain samples and a second generator of a vector containing said N maximum amplitudes, called a peak vector;

an attenuator by correction of constellation symbols, of extrema of a sub-block of N time domain samples corresponding to the discrete Fourier transform of a sub-block of N interleaved symbols, said correction taking account of at least said peak vector and delivering a block of N corrected interleaved symbols;

a de-interleaver of R sub-blocks of N corrected interleaved symbols delivering a block of M corrected source symbols; and a third generator of an OFDM block of said multicarrier signal by discrete Fourier transform of the block of M corrected source symbols.

14. A device for attenuation of extrema of an OFDM type multicarrier signal comprising:

an attenuator, by correction of constellation symbols, of the extrema of a block of N time domain samples corresponding to a discrete Fourier transform of a block of N constellation symbols, said correction taking account of a peak vector representing extrema of said multicarrier signal and delivering a block of N corrected symbols, said signal OFDM type multicarrier signal comprising OFDM blocks constituted by M carriers modulated by constellation symbols, called source symbols, a block of M source symbols corresponding to an OFDM block of M carriers;

an interleaver of M symbols of a block of source symbols into R sub-blocks of N interleaved symbols, where R, M and N are natural integers such that M=R×N, the block of N constellation symbols being a sub-block among said R sub-blocks of N interleaved symbols;

a computer of N maximum amplitudes among time domain samples obtained by discrete Fourier transform of said block of M source symbols and a generator of a vector containing said N maximum amplitudes, called a peak vector;

a de-interleaver of R sub-blocks of N corrected interleaved symbols delivering a block of M corrected source symbols.

* * * * *